AUTOMATIC TOLL TICKETING TELEPHONE SYSTEMS

Filed Feb. 12, 1954 9 Sheets-Sheet 1

INVENTOR.
Edward S. Peterson
BY
Smith, Olsen, Baird & Gulbrandsen
Attys.

INVENTOR.
Edward S. Peterson
BY
Smith, Olsen, Baird & Gulbransen
Attys.

Oct. 13, 1959 E. S. PETERSON 2,908,759

AUTOMATIC TOLL TICKETING TELEPHONE SYSTEMS

Filed Feb. 12, 1954 9 Sheets-Sheet 3

INVENTOR.
Edward S. Peterson
BY
Smith, Olsen, Baird & Gulbrandsen
Attys.

INVENTOR.
Edward S. Peterson
BY Smith, Olsen, Baird & Gulbrandsen
Attys.

INVENTOR.
Edward S. Peterson
BY
Smith, Olsen, Baird & Gullbrandsen
Attys.

Oct. 13, 1959 E. S. PETERSON 2,908,759

AUTOMATIC TOLL TICKETING TELEPHONE SYSTEMS

Filed Feb. 12, 1954 9 Sheets-Sheet 6

Inventor
Edward S Peterson
By
Smith, Olsen, Baird and Gullmandsen
Attys.

INVENTOR.
Edward S. Peterson
BY
Smith, Olsen, Baird & Gulbransen
Attys.

INVENTOR.
Edward S. Peterson
BY Smith, Olsen, Baird & Gulbrandsen
Attys.

Oct. 13, 1959 E. S. PETERSON 2,908,759

AUTOMATIC TOLL TICKETING TELEPHONE SYSTEMS

Filed Feb. 12, 1954

9 Sheets-Sheet 9

INVENTOR.
Edward S. Peterson
BY
Smith, Olsen, Baird & Gulbransen
Attys.

United States Patent Office 2,908,759

Patented Oct. 13, 1959

2,908,759

AUTOMATIC TOLL TICKETING TELEPHONE SYSTEMS

Edward S. Peterson, Elmwood Park, Ill., assignor to General Telephone Laboratories, Incorporated, a corporation of Delaware Application February 12, 1954, Serial No. 410,003

7 Claims. (Cl. 179—7.1)

Figure 1:
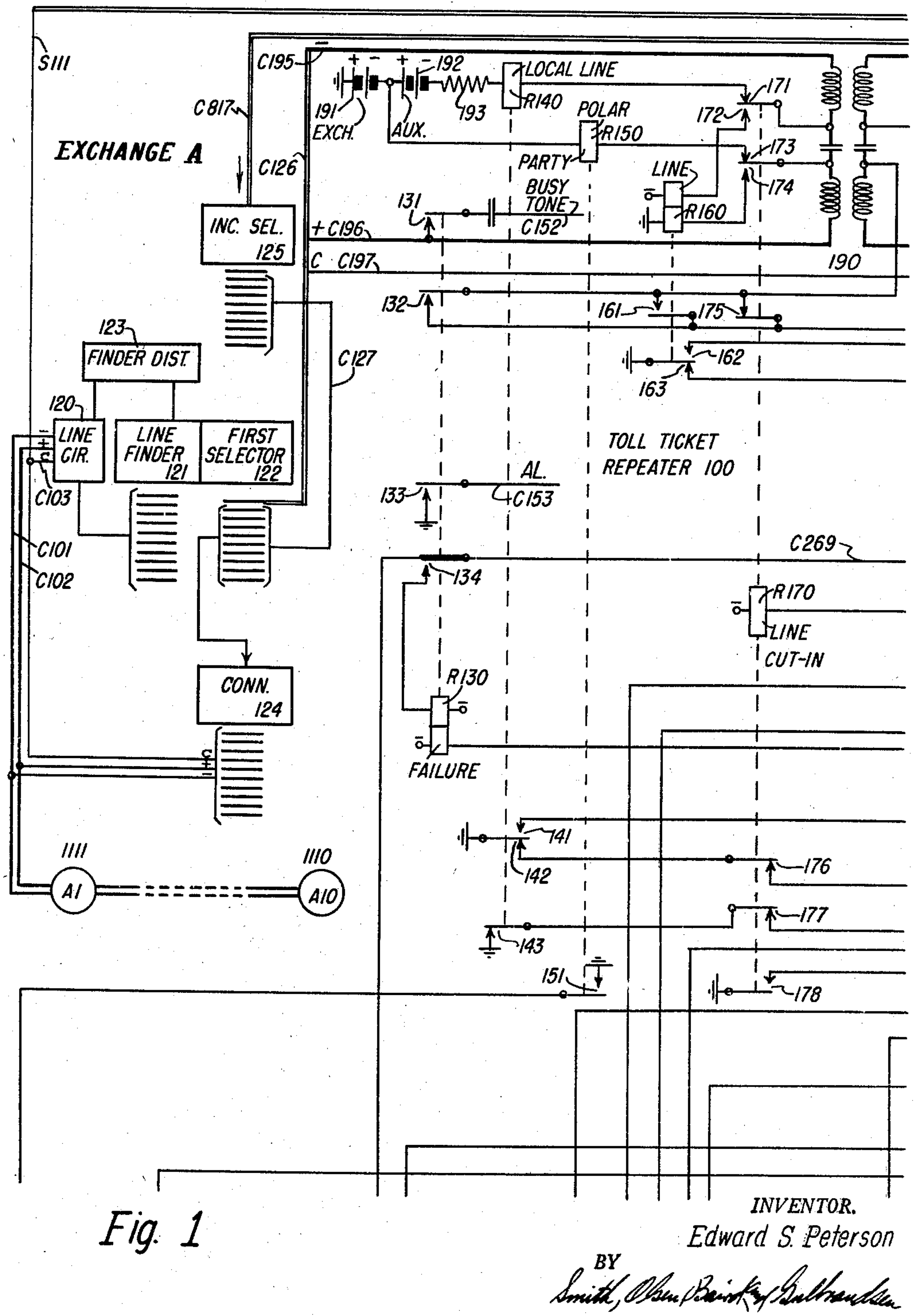
Figure 2:
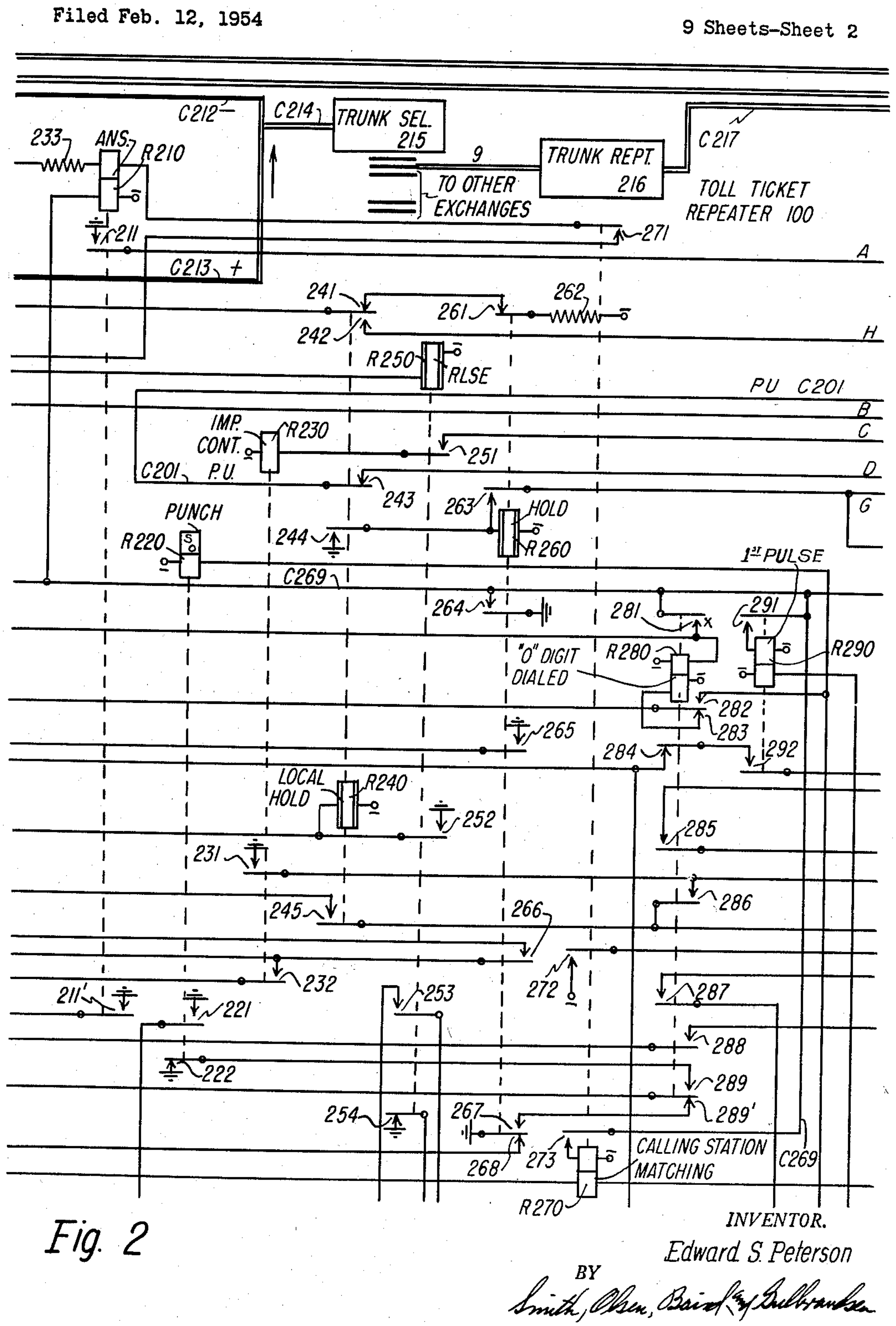

The present invention relates in general to automatic telephone systems and more particularly to improvements in automatic toll ticketing telephone systems arranged to produce an individual record of certain items of information pertaining to each toll telephone connection so that an appropriate charge may be assessed against the calling subscriber.

In prior automatic toll ticketing telephone networks of the type disclosed in the Ostline Patent No. 2,581,287, granted January 1, 1952, (K374) and in the Ostline application Serial No. 75,985, filed February 12, 1949, (K393) toll ticketing telephone connections are completed under control of a register sender or director provided in the originating telephone exchange. During the establishment of a connection, a detector is brought into use to automatically determine the directory number of the calling subscriber substation and it registers the detected calling number in the register sender. Also, during the setting up of the connection, the register sender transfers certain information registered therein, including the calling station directory number, the called station directory number, the rate of charge for the call, and other pertinent items of record information, to a toll ticket repeater provided in the originating exchange. The above noted items of information are temporarily stored in the toll ticket repeater. During the time that conversational connection is maintained between the calling subscriber substation and the desired called substation, the toll ticket repeater accumulates and registers the total elapsed conversational time. Following the release of the connection by the calling and called subscribers, a printer controller or a tabulator is associated with the toll ticket repeater and the items of record information temporarily stored therein are then transferred to the printer controller or tabulator. Incident to the completion of the transfer of the items of information, the toll ticket repeater is restored to normal and rendered available for use in other toll ticketing calls. Thereafter, the printer controller or tabulator is associated with appropriate recording apparatus that is controlled to product an individual record and a common record of items of information pertaining to the completed connection.

Automatic toll ticketing apparatus of the type noted above is particularly useful in a relatively large metropolitan area having a plurality of different zones and wherein each zone includes one or more 10,000 line telephone exchanges. Due to the heavy traffic normally handled in a metropolitan area of the type noted above, the apparatus required to handle the toll ticketing telephone traffic is quite complicated to manufacture and install and can not economically be used in small telephone networks having relatively light toll ticketing traffic between the small capacity exchanges included in such a network.

More specifically, in a telephone network serving a plurality of small exchanges having relatively few interconnecting trunk or toll lines between the different exchanges, it is not economical to employ a telephone exchange switching apparatus utilizing register senders and other special toll ticketing apparatus of the type required to handle the relatively heavy traffic of metropolitan networks.

Accordingly, it is the main object of the present invention to provide an automatic toll ticketing telephone system for use in relatively small exchanges, which is economical to manufacture and install, and which provides the necessary facilities for producing a permanent record of each toll connection.

It is still another object of the invention to provide new and improved circuits and apparatus for an automatic toll ticketing system which are directly controlled from the calling device at a calling station and which do not require the use of register senders or other switch controlling apparatus to establish toll ticketing telephone connections.

It is still another object of the invention to provide in a telephone system having relatively small capacity automatic telephone exchanges, improved toll ticketing repeaters which are directly controllable by calling subscriber dials to register the items of record information pertinent to each toll ticketing connection, such as the calling subscriber number and the called subscriber number, and to record this information as it is transmitted to the toll ticket repeaters by the calling subscribers.

It is still another object of the invention to provide an improved toll ticketing repeater of the type noted, which is arranged to record each unit of elapsed conversational time during an established connection.

It is still another object of the invention to provide in conjunction with the toll ticketing repeater of the type noted, apparatus for automatically verifying the directory number of the calling subscriber that is registered in the toll ticket repeater under control of the calling subscriber dial.

It is still another object of the present invention to provide in a toll ticketing repeater of the type noted, a chain of counting relays arranged to count the impulses of each digit dialed by a called subscriber, to control a recording mechanism to record each of the digits as they are received, and which is also used to control the recorder to produce a record of each unit of elapsed time during the time the conversational connection is maintained between the calling and called subscriber substations.

Further objects and features of the present invention pertain to the particular arrangement of the various circuit elements of the automatic toll ticketing telephone system, whereby the above objects and additional operating features are attained.

The invention, both as to its organization and method of operation, together with further objects and advantages thereof, will best be understood by reference to the following specification taken in connection with the accompanying drawings, in which Figs. 1 to 8, inclusive, taken together, illustrate the details of the apparatus incorporated in exchange A and exchange B of a toll ticketing telephone system, which apparatus has incorporated therein the features of the invention briefly outlined above; Fig. 9 is a schematic trunking diagram of the apparatus provided in the exchange A and the exchange B of the automatic toll ticketing system embodying the present invention; and Fig. 10 illustrates the mode of combining Figs. 1 to 8, inclusive, to form a unified system.

More particularly, Fig. 1 schematically illustrates a portion of the switching apparatus in exchange A, including a line circuit 120 individual to a ten-party line having the ten subscriber substations A1 to A10, inclusive. Also, a line finder 121, a first selector 122, a finder-distributor 123, a connector 124, and an incoming selector 125 are schematically illustrated for the purpose of showing the switching apparatus utilized in establishing connections to and from the subscriber substations in exchange A. Figs. 1 to 7, inclusive, illustrate the details of one of a plurality of toll ticketing repeaters 100 provided in exchange A and which is utilized in establishing toll ticketing connections from a calling subscriber substation in exchange A to a called subscriber substation in exchange B. The toll ticket repeater 100 includes a group of dial pulse counting relays 609, comprising relays R600 to R690, which are controlled by impulses transmitted by the calling subscriber in order to operate the tape perforater 780 to record each of the digits of the calling subscriber directory number, and the called subscriber directory number. This group of relays is also controlled by time pulses, at the rate of ten pulses per minute, to record each minute of the conversational time of a completed telephone connection in the tape perforator 780.

The ticket repeater 100 is also provided with a group of calling station number marking relays 500, comprising relays R520, R530, R540 and R550 which are also controlled by the dial pulse counting relays 609 to identify the particular station number of any one of ten different stations on any calling party line. Also, the toll ticket repeater 100 is provided with a plurality of registers 401, 402, 403 and 501 for registering respectively the hundreds, tens, units and station identifying digits of the calling station directory number. Actually, the calling number registers noted above are utilized in combination with the verifier (Fig. 3) to determine whether or not the number of the calling station as dialed by the calling subscriber thereat and registered in the toll ticket repeater 100 is actually the correct directory number of the calling subscriber substation.

The toll ticket repeater 100 is also provided with a tape perforator 780 which is arranged to perforate an associated tape in code form in accordance with the various digits which are marked, in code form, on the conductors C782W to C782Z, inclusive. Preferably, the tape perforator 780 may be of the type disclosed and described in detail in the Ostline application Serial No. 207,092, filed January 22, 1951 (K409).

A dater-timer unit 371 (Fig. 3) is provided to transmit time pulses to the dial pulse counting relays 609 at six second intervals in order to control the registration of the number of minutes of conversation time; it also transmits a pick-up pulse to the timer connect relay R310 after the termination of a connection so that the dater-timer 371 is connected to the tape perforator 780 and will transmit thereto information pertaining to the date (month and day) and also the clock time (hour and minute) that the conversation is terminated by the calling and called subscribers. The dater-timer 371 is also arranged to transmit a cut-off pulse to the cut-off relay R320 in order to release the toll ticket repeater 100 and in order to control the tape perforator 780 to perforate the associated tape, in code form, to indicate the end of the recorded information pertaining to the particular toll call. This perforated code information is utilized when the tape is subsequently fed through a printing mechanism to indicate either the start-of-message or the end-of-message pertaining to the recorded information, depending upon the direction the tape is fed through the printing mechanism.

Figure 8:
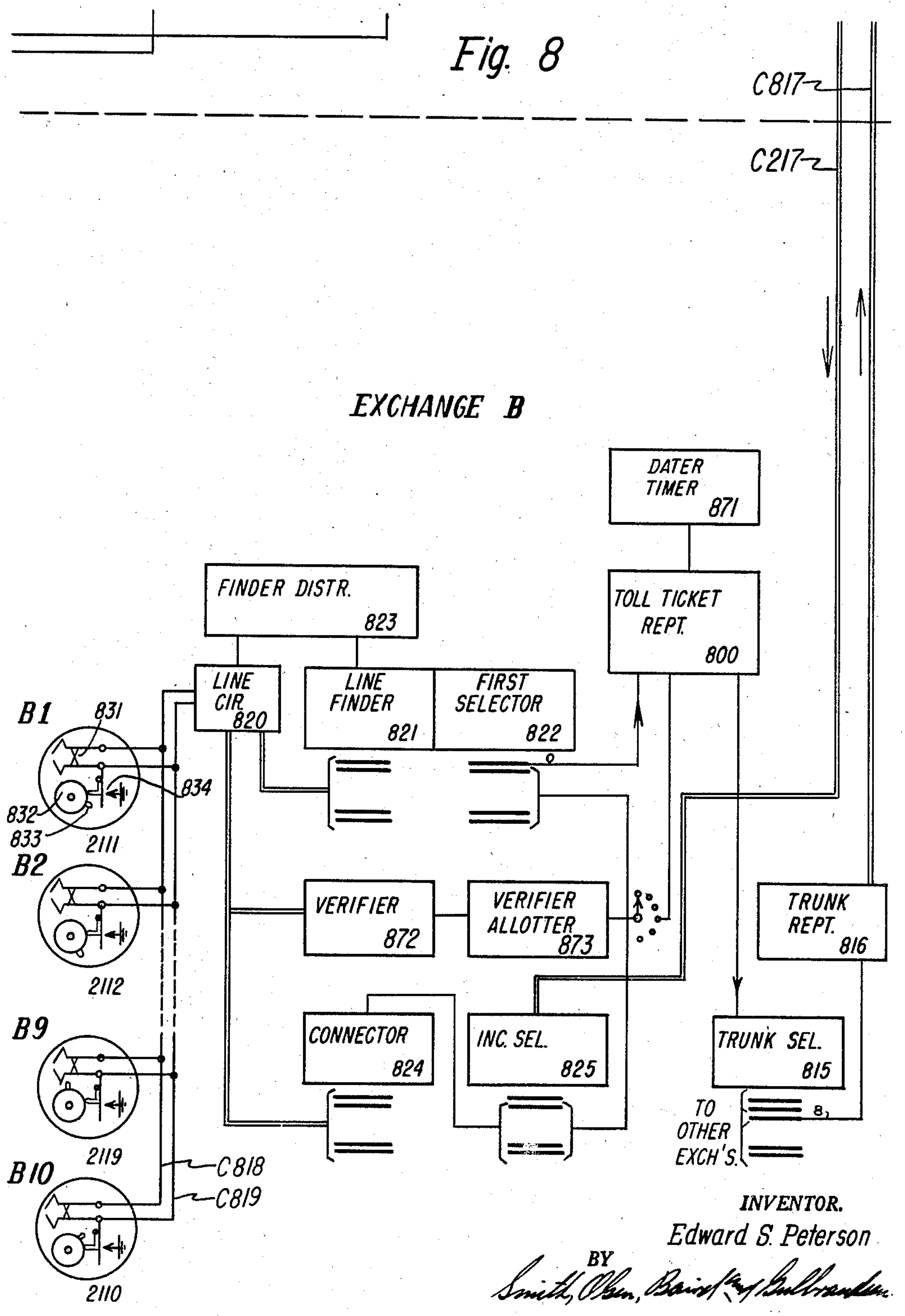
Figures 9, 10:
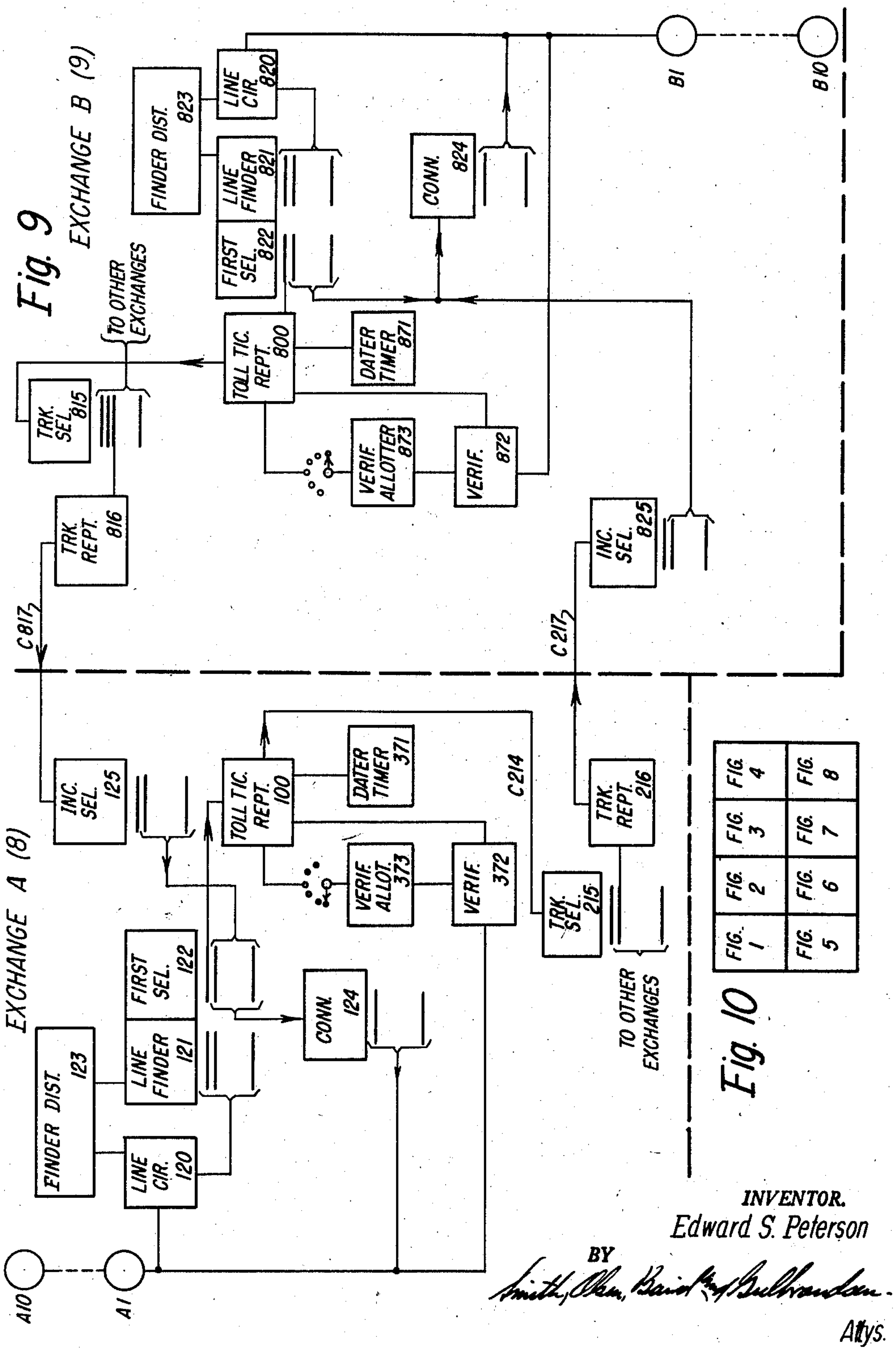

Fig. 8 schematically illustrates the switching apparatus provided in exchange B for the purpose of completing toll ticketing calls received from other exchanges for subscriber substations in exchange B and which is also utilized in establishing toll ticketing connections originated by calling subscriber substations in exchange B for called subscriber substations in other exchanges. Actually, the switching apparatus provided in exchange B is substantially identical to the corresponding apparatus provided in exchange A. Thus, the exchange B includes a line circuit 820 individual to a ten-party line having ten subscriber substations B1 to B10, inclusive.

There is also provided in exchange B, a line finder 821, a first selector 822, a finder-distributor 823, a connector 824, and an incoming selector 825 which have been schematically illustrated for the purpose of showing the switching apparatus utilized in establishing connections to the subscriber substations in exchange B. A trunk selector 815 is also provided which is individual to the toll ticket repeater 800 and which has access to trunk repeaters, such as 816, terminating trunk or toll lines, such as C817, interconnecting the two exchanges. The toll ticket reepater 800, the trunk selector 815 and the trunk repeater 816 in exchange B are exactly the same as the toll ticket repeater 100, the trunk selector 215 and the trunk repeater 216 provided in exchange A. All of the switching apparatus provided in the two exchanges may be of any suitable type such as the well known Strowger switches in common use.

*General arrangement of the telephone system*

A brief description of the system will now be given in connection with the trunking diagram schematically illustrated in Fig. 9. If any one of the subscribers A1 to A10 in exchange A desires to extend a toll ticketing connection to a subscriber substation in exchange B, the line circuit 120, distributor 123 and line-finder 121 will operate in a conventional manner as soon as the calling subscriber removes his receiver, to connect the calling subscriber line to the first selector 122. As illustrated, the line circuit 120 is individual to the ten-party line including the substations A1 to A10, inclusive, but it should be understood that a similar line circuit may be provided for each party line and for each individual line in the exchange. As soon as the calling line is connected to the first selector 122 which is individually associated with the line finder 121, it operates in a conventional manner to transmit the usual dial tone signal to the calling subscriber. The calling subscriber, for example, at substation A1 may now operate the calling device thereat to transmit impulses corresponding to the digits necessary to control the switching aparatus to extend the connection to the desired called subscriber substation in exchange B. In the present illustration, it will be assumed that the calling subscriber at substation A1 dials a first preliminary digit 0 to the first selector 122, which operates in a conventional manner, to advance its wipers in a vertical direction to the tenth level in the associated contact bank and it will then automatically rotate its wipers over the contacts of the selected tenth level to select an idle toll ticket repeater, such as the toll ticket repeater 100.

The second preliminary digit dialed by the calling subscriber in the present system is also the digit 0 which transmits ten impulses to the toll ticket repeater 100 and conditions that unit to respond thereafter to the subsequent digits dialed by the calling subscriber. During the dialing of the second preliminary digit 0, a special dial provided at the calling subscriber substation A1 will transmit a single ground impulse, in the manner to be explained hereinafter, to register in the toll ticket repeater 100 the station digit or position identifying the particular calling subscriber substation on the calling ten-party line. Actually, a single ground pulse will automatically be transmitted during the return movement of the dial at the calling subscriber station, after a particular one of the ten interruptions in the calling subscriber loop circuit resulting from the manipulation of the dial in accordance with the second preliminary digit 0. For example, a ground pulse will be transmitted from the dial at the first station on the ten-party line between the first and second interruptions in the loop impulse circuit during the return movement of the dial to identify the first station. The dial at the second station on the ten-party line is arranged so that it will transmit the station identifying ground pulse between the second and third interruptions in the loop impulse circuit, etc., to the tenth station where the dial is arranged to transmit the ground impulse identifying the tenth station on the party line immediately following the tenth interruption in the loop impulse circuit. Thus, each one of the ten stations is provided with a special dial having a special cam which arranged to transmit a single ground pulse during the transmission of the ten impulses of the second preliminary digit 0 in order to identify the station digit or position of the particular calling station on the ten-party line.

In the toll ticketing repeater 100, the station digit or position of the calling station on the calling party line is temporarily registered and it is compared with the station identifying digit subsequently dialed by the calling subscriber to determine whether or not the digit dialed by the calling subscriber is the same as the station digit or position that was automatically registered in the toll ticket repeater 100 in response to the dialing of the second preliminary digit 0. Preferably, the calling devices provided at the different stations A1 to A10 in exchange A and at the different station B1 to B10 in exchange B may be of the type disclosed in the Ostline Patent 2,410,-520 granted November 5, 1946 but modified so that the special cam will transmit only a single ground impulse over the two conductors of the calling line after the transmission of the first, second, third etc., to the tenth switch controlling impulses of the digit 0. By modifying the above Ostline dial in the manner noted above, ten different stations may be identified by determining the position of the transmitted ground pulse in relation to the ten switch controlling impulses of the preliminary digit 0 dialed into the toll ticket repeater 100, or 800, immediately after seizure thereof.

After the calling subscriber has dialed the preliminary digit 0 into the toll ticket repeater 100 to condition the same for further operation and to temporarily register therein the particular station digit of the calling station on the party line as described above, the calling subscriber will then dial four digits of the directory number of the calling substation. The first three digits correspond respectively to the hundreds, tens and units digits of the three digits identifying the calling party line, and the fourth digit is the station identifying digit. In the present call, the four digits of the calling subscriber directory number, as dialed by the calling subscriber, are registered in the toll ticket repeater 100 and they are also perforated, in code form on a tape associated with the tape perforator 780 provided in the toll ticket repeater 100.

In response to the registration of the calling subscriber directory number in the toll ticket repeater 100, the verification allotter 373 is automatically controlled to find the repeater 100 and to connect verifier 372 to the toll ticket repeater 100 for its temporary exclusive use. When this occurs, the hundreds, tens, and units digits identifying the calling subscriber line and registered in the toll ticket repeater 100, controls the vertifier 372 to select the conductor C individual to the calling subscriber line and the last or station identifying digit registered in the toll ticket repeater 100 is compared with the station identifying digit that was registered in the repeater during the dialing of the preliminary digit 0 into the toll ticket repeater 100. If the calling subscriber has correctly dialed his own directory number, including his station identifying digit, the toll ticket repeater 100 will be conditioned to respond to the digits, identifying the called exchange and the called subscriber substation which may now be dialed by the calling subscriber. It should be noted, however, that the calling subscriber directory number is now perforated on the tape associated with the tape perforator 780 in the toll ticket repeater 100.

In the trunking diagram illustrated in Fig. 9 the trunk selector 215 is individualy associated with the toll ticket repeater 100 and it has access to a plurality of outgoing trunk or toll lines including repeaters, such as the repeater 216, extending to exchange B. Therefore, the called subscriber directory number in the present system includes five digits. The first digit of the number will identify the called exchange, the second, third and fourth digits will correspond to the hundreds, tens and units digits of the number identifying the called subscriber line and the fifth digit will identify the particular called station on the called ten-party line. As each of the above noted five digits are dialed by the calling subscriber they will control the tape perforator 780 in the toll ticket repeater 100 to perforate the associated tape in accordance with the called subscriber directory number. Also these digits will be repeated by the toll ticket repeater 100 so that the first of the five digits will operate the trunk selector 215 to select an idle trunk or toll line including a repeater, such as the repeater 216, in order further to extend the connection to the incoming selector 825 in exchange B. The second or hundreds digit, identifying the called subscriber line in exchange B, operates the incoming selector 825 to select a connector, such as connector 824, having access to a group of one hundred subscriber lines, including called subscriber line. The connector 824, for example, will respond to the third and fourth digits of the called subscriber directory number to select the wanted subscriber line and the last or station identifying digit will control the connector 824 to transmit over the selected called line a ringing frequency that will signal only the subscriber at the particular called subscriber station. However, it will be understood by those skilled in the art that the connector 824 may also be of the type which employs code ringing, in which case several subscriber substations may be rung but the called subscriber at the desired substation will answer the call only if the ringing code corresponds to the code of that particular station.

When the desired called subscriber answers the call, the toll ticket repeater 100 is again controlled so that it now operates the tape perforator 780 to perforate a "space" character function on the associated tape and it will then perforate the tape once for each minute of elapsed conversational time. Upon the termination of the connection by the calling and called subscribers the toll ticket repeater 100 again controls the tape perforator 780 to now make a record of the exact date (month and day) and the time (hour and minute) followed by an end-of-message code to indicate the completion of the recorded toll call. Thus the tape perforated by the tape perforator 780 contains a complete record of the particular toll call so that an appropriate charge may be assessed against the called subscriber. It will be appreciated that the perforated tape may be subsequently utilized to control a conventional printer mechanism so that it will print the actual items of information pertaining to each telephone connection established through the toll ticket repeater 100.

Telephone connections in the opposite direction from exchange B to exchange A are established in substantially the same manner as described above except that the record is produced by the toll ticket repeater 800 provided in exchange B. Such a call, for example, may be established by a subscriber at any one of the substations B1 to B10, inclusive, on the ten-party line in exchange B, by way of the line circuit 820, line finder 821, first selector 822, toll ticket repeater 800, trunk selector 815, repeater 816, the interconnecting trunk or toll line C817, incoming selector 125, connector 124, and the desired called subscriber substation in exchange A.

In the above description of the trunking diagram illustrated in Fig. 9, it is assumed that the called exchange B is identified by a single digit 9 and that the trunk selector 215 in responding to this digit selects the repeater 216 and interconnecting trunk or toll line C217 extending to the desired called exchange B. If it is desirable to have the called exchange identified, for example, by a two or three-digit code, it would only be necessary to introduce respectively one or two additional selectors, such as the trunk selector 215, between the trunk selector 215 and the repeater 216. Thus, if three different switch units are employed between the toll ticket repeater 100 and the repeater 216 it will take three called exchange identified digits to select the trunk or toll line extending to the desired called exchange. Such an arrangement would fit in with the present trend of utilizing three digit office codes to identify the different called exchanges in a telephone network.

*A toll ticketed call from a subscriber in Exchange A to a subscriber in Exchange B*

A description will now be given of the operation of the switching apparatus included in the exchanges A and B. For this purpose, it will be assumed, that a call is originated by a subscriber at substation A1 in exchange A having the directory number 1111 and it is intended to be extended to the called subscriber at substation B1 in exchange B having the directory number 2111. It will be recalled, however, that the subscriber at substation A1 is one of ten subscribers on a ten-party line and that the last digit of the directory number of the ten different subscribers is the station identifying digit. Consequently, the first three digits of the directory number of any one of the ten subscribers is 111 and the fourth or last digit may be any one of the ten digits 1 to 9, inclusive, and 0 depending upon the position of the station on the ten-party line.

When the calling subscriber at substation A1 removes his receiver, a loop circuit, including the line conductors C101 and C102, is completed for operating the line circuit 120. The line circuit 120 in turn initiates operation of the finder distributor 123 and marks the terminals of the calling subscriber line in the bank contacts of the group of line finders, including the line finders 121, having access to the calling line. For the purpose of this description it will be assumed that the finder distributor 123 selects the line finder 121 and that the finder operates its wiper set in a vertical and then in a rotary direction in a conventional manner, to select the terminals marked as calling by the calling subscriber. As soon as the calling line is found by the line finder 121, it extends the calling line to the individual associated first selector 122 and the selector in turn transmits the usual dial tone signal to the calling subscriber to indicate that dialing may be started. The above noted switching apparatus, including the line circuit 120, finder distributor 123, line finder 121 and the first selector 122 may be of conventional construction and arrangement and may be, for example, of the type illustrated in the Bakker Patent No. 2,289,896, granted July 14, 1942, and illustrated in the Saunders Patent No. 1,849,694, granted March 15, 1932.

If the present call is to be extended to another subscriber substation in exchange A, the calling subscriber may dial the four-digits of the directory number of the said other subscriber in exchange A. In the latter event the selector 122 will respond to the first digit to select a connector, such as 124, and the latter connector will respond to the last three digits in order to select the desired called line and to transmit a ringing signal thereover in accordance with the last or ringing digit of the directory number. Thus it will be understood that all local calls may be completed without dialing the toll ticket repeater 100 and such calls will not be recorded.

Since the calling subscriber at substation A1 intends to extend the present connection to a called subscriber in exchange B it is necessary, when dialing is started, to dial the preliminary digits 00 indicative of a toll ticketed call. Consequently, when the calling subscriber at substation A1 receives the dial tone signal from the first selector 122, the dial is actuated in accordance with the first preliminary digit 0 to transmit ten loop impulses to the first selector 122. The selector is controlled by the loop impulses to raise its wiper set in a vertical direction to the tenth level of the associated contact bank and then to automatically rotate its wiper set over the contacts of the selected level to search for an idle toll ticket repeater, such as 100.

It will be assumed that the first selector 122 now extends the connection from the calling subscriber substation A1 to the toll ticket repeater 100 illustrated in Figs. 1 to 8, inclusive, by way of the cable 126. The cable 126 includes the — conductor C195, + conductor C196, and the control NC conductor C197. If the toll ticket repeater 100 is busy the C conductor C197 will be grounded to indicate the busy condition to the first selector 122 and if the repeater 100 is available for use the conductor 197 will be marked with a resistance battery potential. Consequently, the selector 122 automatically rotates its wipers over the bank contact terminating toll ticket repeaters that are marked with a busy ground potential and it will seize the first available repeater that is marked with a resistance battery potential.

As soon as the selector 122 seizes the toll ticket repeater 100, it extends the loop circuit, including the — and + conductors C101 and C102 of the calling subscriber line by way of the line circuit 120, line finder 121 and first selector 122 to the — and + conductors C195 and C196 in the cable C126. Referring to Fig. 1 it will be seen that this loop circuit is further extended by way of the upper left-hand winding of the repeating coil 190, contacts 171, winding of the local line relay R140, and resistor 193, to the negative pole of the 50 volt auxiliary battery 192. The loop circuit is also extended by way of the + conductor C196, lower left-hand winding of the repeating coil 190, contacts 173, winding of the polarized party line relay R150, to the positive pole of the 50 volt auxiliary battery 192. The completion of the above described loop circuit through the windings of the relays R140 and R150 causes the relay R140 to operate, but since the party line relay R150 is of the polarized type, the current flow through its winding is in a direction to prevent the relay from operating at this time.

Since the line relay R140 operates, it completes, at its contacts 141, an obvious circuit for operating the local hold relay R240. The latter relay, at its contacts 141, removes the resistance battery potential from the C conductor C197 and, at its contacts 242, it applies a holding ground potential to this C conductor in order to mark the toll ticket repeater 100 busy and to hold the selector 122, the line finder 121 and the line circuit 120 in their operated positions, and also to ground the conductor C103 to mark the calling line busy in the banks of the connectors having access thereto. The circuit for applying the ground potential to the control conductor C197 may be traced by way of the contacts 242, conductor H in the cable C301, and contacts 764 (Fig. 7), to ground. As a further result of the operation of the local hold relay R240, at its contacts 243, it opens a point in a circuit including the pickup conductor C201; at its contacts 244, it completes a circuit for operating the hold relay R260; and at its contacts 245, it prepares a point in the circuit, traced hereinafter, for subsequently operating the pulse control relay R320.

Referring now to the hold relay R260 it will be seen that upon its operation it interrupts, at its contacts 261, a further point in the circuit for applying resistance battery to the control conductor C197; it prepares, at its contacts 263, a point in the circuit for subsequently locking itself in its operated position; and, at its contacts 264, it applies a holding ground potential to the locking conductor C269 whereby certain of the relays in the toll ticket repeater 100 may be held in an operated position under control of the operated hold relay R260. It should be noted, however, that the ground potential applied to the locking conductor C269 completes a circuit for energizing the lower polarizing winding of the answer relay R210. The latter relay will not operate to close its contacts 211, until the current flow through a circuit including the upper winding of the relay is in a proper direction. As a further result of the operation of the hold relay R260, at its contacts 265, it extends ground potential to the locking circuits for the upper windings of the calling station number marking relays 500 (Fig. 5) whereby one or more of the four relays R520 to R550, inclusive, may be locked in their operated positions under control of the hold relay R260. At its contacts 266, the relay R260 prepares a point in an impulsing circuit whereby the dial pulse counting relays 609 (Fig. 6) are selectively operated to count the number of impulses transmitted by calling subscriber to the local line relay R140. Finally, at its contacts 267, the hold relay R260 prepares a point in a circuit for controlling the transfer relays R570, R580, and R590 in series with certain operated ones of the different counting relays 609. The toll ticket repeater 100 is now in position to respond to the second preliminary digit 0 dialed by the calling subscriber. It should be remembered, however, that the first dialed preliminary digit 0 operated the first selector 122 to seize the toll ticket repeater 100 in the manner described above.

*Dialing the digit 0 into the toll ticket repeater 100*

In response to the dialing of the second digit 0, the local line relay R140 restores and reoperates ten times. The first time the line relay R140 restores to normal it completes, at its contacts 142, a circuit including contacts 176 and 245 for operating the pulse control relay R320. The relay R320 is of the slow-to-release type and it remains operated during impulsing. Its operation at the present time is of no particular importance. As a further result of the first restoration of the relay R140, at its contacts 143, it now completes a circuit, including contacts 177, 266, 576, 584 and 594, in order to operate the first counting relay R600. At the end of the first impulse, the local line relay R140 reoperates and it interrupts the initial energizing circuit for the first counting relay R600. However, the latter relay, at its contacts 602, now locks itself in its operated position over a circuit including the contacts 582, winding of the first transfer relay R570, contacts 289′ and 267, to ground. The first transfer relay R570 now operates, in series with the operated first counting relay R600, to prepare, at its contacts 575, a circuit for operating the second counting relay R610. As a further result of the operation of the counting relay R600, it prepares, at its contacts 603, a point in a circuit for operating the second counting relay R610; it prepares, at its contacts 604, a point in the circuit including the conductor C557A, for operating the calling station number marking relay R550; and, at its contacts 605 to 608, inclusive, it prepares points in the circuits for controlling the tape perforator 780 to perforate, in code form, the digit 1. However, at the present time the tape perforator 780 will not be controlled by the counting relays 609 due to the fact that they are being controlled by the first preliminary digit 0 dialed into the toll ticket repeater 100. As a further result of the operation of the first transfer relay R570, at its contacts 571, it completes a circuit for operating the first pulse relay R290. The latter relay, upon operating, locks itself in its operating position over a circuit including its upper winding, contacts 290, and the grounded locking conductor C269.

As soon as the local line relay R140 restores to normal in response to the second interruption in the loop circuit during the dialing of the digit 0, the contacts 143 are again closed in order this time to operate the second counting relay R610 and at the end of the second impulse the relay 140 reoperates to interrupt the circuit for the relay R610. However, the latter relay locks itself in its operated position over a circuit including its contacts 611 and 592, winding of the second transfer relay R580, contacts 289′ and 267, to ground. Thus it will be seen that the second transfer relay R580 operates and locks in series with the second counting relay R610. As a further result of the operation of relay R610, at its contacts 612, it prepares a point in the circuit for operating the third counting relay R620; at its contacts 613, it prepares a point in the circuit including the conductor C557B for operating the calling station number marking relay R540; and, at its contacts 614 and 615, it prepares points in the circuit, which are not effective during the dialing of the preliminary digit 0, for controlling the tape perforator 780 to perforate, in code form, the digit 2. Incident to the operation to the second transfer relay R580, at its contacts 582, it opens the series circuit for the first counting relay R600 and the first transfer relay R570 so that these relays restore to normal.

The third restoration of the local line relay R140 completes, at its contacts 143, a circuit including contacts 177, 266, 576, 583 and 612, for operating the third counting relay R620. At the end of the third impulse, the local line relay R140 operates to interrupt the initial energizing circuit for the third counting relay R620, but the latter relay locks itself over a circuit including contacts 621 and 574, winding of the third transfer relay R590, contacts 289′ and 267, to ground. At its contacts 622, the relay R620 prepares a point in the circuit for operating the fourth counting relay R630; it prepares, at its contacts 623, a point in the circuit including the conductor C577C for operating the station marking relay R530; and, at its contacts 624 and 625, it prepares points in the circuit, not effective at the present time, for controlling the tape perforator 780 to perforate the digit 3. Incident to the operation of the third transfer relay R590, at its contacts 592, it interrupts the series circuit for the second transfer relay R580 and the second counting relay R610 in order to restore these relays and, at its contacts 593, it prepares a point in the circuit for operating the fourth counting relay R630.

The remaining seven impulses of the preliminary digit 0 transmitted to the local line relay R140 sequentially control the fourth to the tenth counting relays R630 to R690, inclusive, in substantially the same manner as the first three impulses control the first three counting relays R600 to R620, inclusive. Also it should be noted that the fourth, seventh and tenth counting relays R630, R660 and R690 will each lock in their operated positions in series with the first transfer relay R570; the fifth and eighth counting relays R640 and R670 will each lock in series with the second transfer relay R580; and that the sixth and ninth counting relays R650 and R680 will lock in series with the third transfer relay R590. It should also be noted that each of the counting relays is provided with contacts for preparing appropriate circuits for the conductors C557A to C557D, inclusive, whereby any one or any pair of the calling station number marking relays R520 to R550 may be operated to indicate the position of the calling station on a calling ten-party line. Furthermore, the different counting relays are provided with various contacts for controlling the tape perforator 780 to perforate the associated tape, in code form, to make a record of the corresponding digit that is counted by the corresponding counting relays 609. Before describing the operation of the circuit which is initiated in response to the last impulse of the digit 0, a description will first be given of the manner in which the special dials provided at the party line subscriber substations are utilized to register in the toll ticket repeater 100 the station digit or position of the particular calling subscriber substation on the calling party line.

As previously noted the different dials at the different subscriber substations are respectively provided with a special cam which will transmit a ground pulse over the calling line during the time interval that the dial is returning to normal to transmit the ten impulses of the digit 0 to the toll ticket repeater 100. In Fig. 8 there is schematically illustrated the special cam 832 at substation B1 having a high point 833 thereon for closing the contacts 834 immediately after the loop impulsing contacts 831 are closed after the first impulse is transmitted during the dialing of a single digit 0. In other words, the contacts 834 will transmit a ground pulse over the two line conductors C818 and C819 immediately after the first loop impulse of the ten impulses of the digit 0 has been transmitted by the contacts 831. Each of the remaining stations on the ten-party line will transmit the single ground impulse at a different time interval during the dialing of the single digit 0 as has been described previously. It will be assumed that the dial at the substation A1 (Fig.1) is exactly the same as the dial at the subscriber substation B1 (Fig. 8). When the ground impulse appears on the line conductors C101 and C102 (Fig. 1) the circuit is retained for holding the local line relay R140 in its operated position but the current flow through the winding of the polarized party relay R150 is now reversed so that the relay operates. During the time that the ground potential is applied to the − and + ground conductors C195 and C196, the circuit for the local line relay R140 includes the resistor 193, the auxiliary battery 192, the exchange battery 191 and ground, whereas the circuit for the polarized party line relay R150 includes the exchange battery 191 and ground. Thus the local line relay R140 is held in its operated position over a circuit including the two batteries 191 and 192 in series and the polarized relay R150 operates over the circuit including only the exchange battery 191. The current flow through the winding of the relay R150 is in such a direction that it will now cause the relay to operate.

If the polarized relay R150 is operated immediately following the first restoration and then reoperation of the line relay R140, the contacts 151 will complete a circuit including the contacts 529, 538, 545, and 554, conductor C556, contacts 614 on the now operated first counting relay R600, conductor C557A, and the lower winding of the relay R550, to battery. The relay R550 will operate and, at its contacts 553, will lock itself in its operated position over a circuit including its upper winding and ground at its contacts 265. Also, at its contacts 554, the relay R550 will interrupt the initial operating circuit for itself. Finally, at its contacts 552, the relay R550 will apply ground potential by way of the contacts 543, 535, and 526, and conductor 1, to mark the contact 1 accessible to the wiper 515 on the calling station digit register 501. In other words, the position of the single ground pulse with relation to the ten impulses of the first digit 0 transmitted to the toll ticket repeater 100 will operate one or more of the calling station marking relays 500 to indicate the last digit of the directory number of the calling subscriber substation. The following table will show the operated counting relays 609, the operated marking relays 500 and the station identified in accordance with the ground pulse appearing after any one of the ten impulses of the first digit 0 transmitted to the toll ticket repeater 100.

| Ground Pulse After Loop Impulse | Operated Counting Relay | Operated Marking Relay | Calling Station |
|---|---|---|---|
| 1 | R600 | R550 | 1 |
| 2 | R610 | R540 | 2 |
| 3 | R620 | R530 | 3 |
| 4 | R630 | R520 | 4 |
| 5 | R640 | R550–R540 | 5 |
| 6 | R650 | R550–R530 | 6 |
| 7 | R660 | R550–R520 | 7 |
| 8 | R670 | R540–R530 | 8 |
| 9 | R680 | R540–R520 | 9 |
| 0 | R690 | R530–R520 | 0 |

From the foregoing table it will be appreciated that any calling one of the ten stations on a calling ten-party line will be identified in accordance with its last digit of the directory number in the banks of the calling station digit register 501 incident to the dialing of the preliminary digit 0 into the toll ticket repeater 100.

At the conclusion of the dialing of the first digit 0 into the toll ticket repeater 100, the tenth counting relay R690 is operated in the manner described previously and, at its contacts 699, it completes a circuit including contacts 554, 699, 573 and 283 for operating the 0 digit dialed relay R280. The latter relay, at its contacts 281, locks itself over a circuit including its upper winding to the grounded locking conductor C269. Also the ground potential on the locking conductor C269 is now extended by way of the contacts 281 to complete the operating circuit for the line cut-in relay R170. Thus the operation of the relay R280 registers the fact that the calling subscriber has properly dialed the preliminary 0 digit into the toll ticket repeater 100 and it conditions the latter unit to respond to subsequent dialed digits.

Referring again to the operation of the relay R280 it will be seen that, at its contacts 283, it transfers its intial operating circuit for its lower winding to a circuit including the contacts 282 but the latter circuit is ineffective at this time inasmuch as all of the transfer relays R570, R580 and R590 and all of the counting relays 609 are restored to normal incident to the operation of relay R280. The circuit for restoring the above noted transfer and counting relays is controlled at the contacts 289′ which are opened as soon as the relay R280 operates. Therefore, the circuit for locking the transfer relay R570 in series with the tenth counting relay R690 is interrupted and these relays restored to normal. Also, at the contacts 699 and 573 the relays R690 and R570 respectively interrupt the initial operating circuit for the lower winding of the relay R280. The remaining circuits controlled by the contacts 284 to 289, inclusive, are ineffective at the present time. Attention, however, is directed to the fact that at the end of the dialing of the preliminary digit 0 into the toll ticket repeater 100, the local line relay R140 remains in its operated position to open its contacts 142 and thereby cause the restoration of the slow-to-release pulse control relay R320.

Referring now to the line cut-in relay R170 it will be recalled that this relay also operated at the end of the dialing of the preliminary digit 0. At its contacts 171 to 174, inclusive, the relay R170 disconnects the calling subscriber loop circuit from the circuit including the windings of the local line relay R140 and polarized party line relay R150 and it connects the loop circuit to the upper and lower windings of the line relay R160 which now operates. It is thus apparent that the calling subscriber loop circuit will now control the double-wound line relay R160 in accordance with the impulses of the remaining digits dialed by the calling subscriber and it should also be apparent that the station identifying ground impulses that may be transmitted during each actuation of the calling subscriber dialed will not interfere with the normal control of the line relay R160. In other words, the station identifying ground impulse that is transmitted during the dialing of the preliminary digit 0 is only utilized to control the polarized relay R150. Thereafter, the ground impulse is ineffective to control the toll ticket repeater 100.

As a further result of the operation of the line cut-in relay R170, at its contacts 175, it opens a point in the incomplete circuit for the upper winding of the answer relay 210 but a further point in the circuit is prepared through the contacts 161 on the now operated line relay R160. At its contacts 176, the relay R170 opens a point in the previously traced circuit for the pulse control relay R320 to prevent operation of the latter relay under control of the contacts 142 of the local line relay R140. It should be noted that the last-mentioned relay restores to normal immediately after its circuit is opened by the operation of the cut-in relay R170. At its contacts 177, the relay R170 also interrupts a point in the circuit for the counting relay 609 to prevent the latter relays from being controlled by the contacts 143 on the relay R140.

As soon as the line relay R160 operates over the series circuit including the calling subscriber line, it completes, at its contacts 162, an obvious circuit for operating the release relay R250 and the latter relay, at its contacts 252, completes an obvious circuit for maintaining the local hold relay 240 in its operated position. In this connection it should be noted that the local hold relay R240 is of the slow-to-release type and does not restore to normal during the time interval between the opening of the contacts 141 by the restoration of the local line relay R140 and the closing of the contacts 252 incident to the operation of the release relay R250. As a further result of the operation of the release relay R250, at its contacts 251, it prepares a circuit for operating the impulse control relay R230 which may be traced from battery, winding of relay R230, contacts 251, conductor C in the cable C301, contacts 718, conductor B in the cable C301 and contacts 163, to ground. Inasmuch as line relay R160 is now in its operated position the contacts 163 are opened so that the impulse control relay R230 does not immediately operate. However, each time the line relay R160 restores and reoperates under control of the impulses of the different digits dialed by the calling subscriber, the impulse control relay R230 will operate and restore accordingly. Finally, at the contacts 254, the relay R250 removes ground potential from the contacts 699 in order to prevent subsequent operation of the tenth counting relay R690 from directly controlling the punch relay R220. The toll ticket repeater 100 is now in condition to respond to the next digit or digits dialed by the calling subscriber.

In the description thus far it has been assumed that the calling subscriber has properly dialed the preliminary digit 0 and has thereby caused the operation of the 0 digit dialed relay R280 which in turn operated the cut-in line relay R270 to transfer the calling subscriber loop circuit from the relays R140 and R150 to the relay R160. It is advisable to describe at this time the operations that result in the event that the subscriber should dial any digit other than 0 as the preliminary digit. When this occurs the 0 digit dial relay R280 will not be operated under control of the contacts 699 on the tenth counting relay R690, inasmuch as the last-mentioned relay will not operate if any digit other than 0 is dialed as a preliminary digit. At the conclusion of the dialing of the preliminary digit, other than 0, the local line release R140 will remain in its operated position during the interdigital pause in dialing, in the usual manner. Consequently, the contacts 142 will remain open for a time interval that is sufficient to permit the pulse control relay R320 to restore to normal. When this occurs the contacts 321 will complete a circuit including the contacts 292 on the operated first pulse relay R290 (assuming that at least the digit 1 has been dialed as a preliminary digit), contacts 284 on the unoperated 0 digit dialed relay R280, and the winding of the failure relay R130, to battery. The relay R130 operates over this circuit and immediately locks itself over a circuit including its upper winding and its contacts 134, to the locking conductor C269. As a further result of the operation of relay R130, at its contacts 131, it connects the busy tone conductor C152 to the + conductor C196 included in the calling subscriber loop circuit. The busy tone signal normally applied to the conductor C152 is thereby transmitted to the calling subscriber to indicate that the call cannot be completed to its destination. Finally, at its contacts 133, the failure relay completes a circuit including the alarm conductor C153 to actuate an exchange signal (not shown) and thus indicate to an exchange attendant that the subscriber connected to the toll ticket repeater 100 has failed to dial the proper preliminary digit 0. Both the alarm signal and the busy tone signal will be retained until the calling subscriber releases the connection in the usual manner.

It will now be assumed that the calling subscriber has properly dialed the preliminary digit 0 and that the toll ticket repeater 100 has been operated in the manner described previously to the point where it is in condition to respond to the next digit or digits dialed by the calling subscriber.

*Dialing the four digits of the calling station directory number*

The calling subscriber at substation A1 may now dial the four digits 1111 of the calling station directory number and thereby control the line relay R160 in the toll ticket repeater to restore and reoperate in response to each impulse of each of the four dialed digits. At the contacts 163, the relay R160 upon restoring, completes the previously traced circuit for operating the impulse control relay R230. Attention is directed to the fact that this circuit is completed in response to each restoration of the relay R160 and the contacts 162 intermittently control the circuit for the release relay R250, which remains in its operated position due to its slow-to-release position. Each time the impulse control relay R230 operates it completes, at its contacts 231, a circuit including the contacts 286 for controlling the pulse control relay R320. The last mentioned relay operates in response to the first impulse and remains in its operated position, due to its slow-to-release characteristics, during each of the remaining impulses of any given digit, but it restores to normal during the interdigital pause between successive digits. Also, the contacts 231 complete a circuit including the contacts 334 for operating the magnet M430 of the calling hundreds digit register 401. At the end of the impulse the contacts 231 will open the circuit for the magnet M430 and it will restore to normal to advance its wiper 433 one step in a clockwise direction into engagement with the contact 1. It will be apparent that the number of impulses of the first digit dialed by the calling subscriber will control the line relay R160 and the impulse control relay R230, so that the magnet M430 will operate and restore a corresponding number of times to register in the register 401 the same digit that was dialed by the calling subscriber.

In addition to registering the first digit 1 of the calling subscriber directory number in the calling hundreds digit register 401, the impulse control relay R230, at its contacts 232, transmits impulses corresponding to the first dialed digit of the directory number to the dial pulse counting relays 609. This circuit includes ground at its contacts 178, contacts 232, 576, 584, and 594, and the winding of the first counting relay R600 to battery. At the end of the first pulse, the above mentioned circuit is interrupted and the first counting relay R600 locks itself in series with the first transfer relay R570 over a circuit including the contacts 602, 582, 289 and 222, to ground. Additional impulses of the first digit will control the counting relays 609 and the transfer relays R570, R580 and R590 in the same manner as has been previously described. In other words the number of impulses of the digit dialed by the calling subscriber will sequentially operate the counting relays 609 until the counting relay corresponding to the number of impulses in a given digit operates, and then locks itself in series with its transfer relay.

In the present example it has been assumed that the first digit of the calling subscriber directory number is the digit 1 and consequently only the first counting relay R600 will be operated and locked at this time. During the interdigital pause between the dialing of the first digit 1 and the second digit 1 of the four digit calling subscriber directbry number, the line relay R160 is retained in its operated position to hold the release relay R250 operated and the latter relay, at its contacts 252, retains the local hold relay R240 in its operated position. Finally, the relay R240, at its contacts 244, retains the hold relay R260 in its operated position. At the contacts 163, the line relay R160 opens the circuit for the impulse control relay R230 and the latter relay, at its contacts 231, opens the circuit for the pulse control relay R320 which restores to normal during the inter-digital pause.

At this time it should be noted that during the dialing of the impulses of the first digit of the calling subscriber directory number, the relay R320 is operated and it completes at its contacts 322 a circuit including contacts 285 and 332 for operating the calling number digit transfer relay R335. This relay, at its contacts 336, prepares a locking circuit for itself which is in series with the relay R330 and the grounded locking conductor C269. However, as long as initial operating ground potential for the relay R335 is retained at the contacts 322, the relay R330 is shunted to prevent its operation. At the end of the series of impulses, the pulse control relay R320 restores to normal, and, at its contacts 322, it removes the shunting ground potential from the relay R330 to permit the latter relay to operate and lock in series with the operated relay R335. The relay R330, at its contacts 331, prepares a circuit for operating the relay R345 and, at its contacts 333, it prepares a point in the impulsing circuit for controlling the calling tens digit register 402.

As a further result of the restoration of the relay R320 circuits are controlled at contacts 323 and 324, whereby the tape perforator 780 will perforate the associated tape in accordance with the digit of the calling subscriber number that is presently registered in the dial pulse counting relays 609. Before describing these circuits, however, it may be well to mention the fact that the tape perforator 780 is of the four-hole code or channel perforator of the type disclosed in the John E. Ostline application Serial No. 207,092, filed January 22, 1951. The tape perforator illustrated in Fig. 5 of the above noted Ostline application includes four marking conductors for controlling the perforating magnets in a predetermined manner and these four conductors have been designated in Fig. 7 of the present application as conductors C782W to C782Z, inclusive. The additional conductor is also provided in the tape perforator of the Ostline application and it controls the punch magnet therein so that the tape will be perforated in accordance with the operated condition of one or more of the perforating magnets. This conductor has been designated as the punch conductor C781 in the present application. The following table illustrates the manner in which the conductors C782W to C782Z, inclusive, may be marked in order to control the tape perforator 780 to perforate, in code form, the different digits and additional information:

| Marked Conductor C782 | Code Information |
|---|---|
| WX | 1 |
| WY | 2 |
| WZ | 3 |
| XY | 4 |
| XZ | 5 |
| YZ | 6 |
| W | 7 |
| X | 8 |
| Y | 9 |
| Z | 0 |
| WXYZ | End of ticket |
| Blank | Space |

As previously noted, the digit 1 is at the present time registered in the counting relay 609 by the operated condition of the first counting relay R600 and the transfer relay R570. Consequently, when the pulse control relay R320 restores to normal, at the end of the dialing of the first digit 1 of the calling subscriber directory number, a circuit is completed which may be traced from ground at contacts 714 (Fig. 7), contacts 323, 287, and 607 and 608 in multiple, 727 and 729 in multiple, to mark the conductors C782W and C782X extending to the tape perforator 780 in accordance with the digit 1. This conditions the perforating magnets in the tape perforator 780 to perforate the associated tape, in code form, in accordance with the digit 1. It will be understood that the operated condition of any one of the ten counting relays 609 will mark one or more of the conductors C782W to C782Z, inclusive, in accordance with any other digit dialed by the calling subscriber.

As a further result of the restoration of the relay R320, a circuit is now completed whereby the punch magnet in tape perforator 780 will be actuated to control the perforation of the associated tape in accordance with the particular markings on the conductors C782W to C782Z, inclusive. This circuit may be traced from ground at contacts 711 (Fig. 7), contacts 324, 288, 572 (581 or 591 depending upon the operated transfer relay) 713, and the winding of the slow-to-operate punch relay R220, to battery. The relay R220 now operates and completes, at its contacts 221, a circuit including the punch conductor C781 in order to operate the punch magnet in the tape perforator 780. At this time the first digit 1 of the calling subscriber directory number, as dialed by the calling subscriber, is now perforated, in code form, on the tape associated with the tape perforator 780. Shortly after the contacts 221 are closed by the punch relay R220, the contacts 222 are opened in order to interrupt the previously traced locking circuit for the transfer relay R570 and the first counting relay R600 so that these relays now restore to normal. It should be noted that the same circuit will be interrupted to restore any other operated transfer relay and counting relay. The restoration of any operated transfer relay will at this time interrupt, at the contacts 572, 581 or 591, the above traced circuit for the punch relay R220 whereupon the latter relay will restore to interrupt the circuit for the operated punch magnet in the tape perforator 780. Accordingly, the associated tape will be advanced one step so that it will be in a position to be perforated in accordance with the next digit of the four digit calling subscriber directory number 1111 as dialed by the calling subscriber.

The second digit 1 of the four digit calling subscriber directory number 1111 is now dialed by the calling subscriber and it controls the line relay R160 and the impulse control relay R230 in the same manner as has been previously described. In response to the first impulse, the impulse control relay R230, at its contacts 231, again operates the pulse control relay R320 and it transmits a pulse over the circuit including the contacts 333 and 344 to operate the magnet M435 of the calling ten digit register 402. Obviously, any digit from 1 to 9, inclusive or 0, may be transmitted in this manner by the calling subscriber and registered in the calling tens digit register 402 depending upon the value of the second digit of the calling subscriber directory number. Also the impulse control relay R230 transmits, at its contacts 232, a corresponding number of impulses to the dial pulse counting relays 609, so that the number of impulses in the second digit of the directory number will also be registered therein and the corresponding transfer relay R570, R580 or R590 will operate and lock in series with the particular operated counting relay. As soon as the pulse control relay R320 operates, at the beginning of the second digit, the contacts 322 are closed to complete a circuit, including the contacts 285, 331 and 342, to operate the transfer relay R345.

At the end of the dialing of the second digit of the calling subscriber directory number, the relay R320 restores to normal to interrupt the above traced circuit for operating the relay R345 whereupon this relay locks itself, over a circuit including its contacts 346, and the winding of the transfer relay R340, to the grounded locking conductor C269. The relay R340 upon operating prepares, at its contacts 341, the circuit for the transfer relay R355 and it prepares, at its contacts 343, the impulsing circuit for the magnet M440 of the calling units digit register 403. As a further result of the restoration of the pulse relay R320, during the interdigital pause between the dialing of the second and third digits of the calling subscriber directory number, the contacts 323 again complete the circuit for marking the conductors C782W to C782Z, inclusive, in accordance with the operated condition of one of the dial pulse counting relays 609 as previously described. Also, at the contacts 324, the relay R320 completes the previously traced circuit for operating the punch relay R220 and the latter relay, at its contacts 221, again completes the circuit for operating the punch magnet in the tape perforator 780 whereby the second digit 1 of the calling subscriber directory number 1111 is perforated on the associated tape in accordance with the markings on the conductors C782W to C782Z inclusive. The operated counting relay and the associated transfer relay restore to normal, in the manner previously described, and in turn cause the restoration of the punch relay R220, whereby the tape perforator 780 will advance its associated tape an additional step so that it is in position to be perforated in accordance with the next digit dialed by the calling subscriber.

The third digit 1 of the calling subscriber directory number 1111 is now dialed and is accordingly registered in the calling units register 403; it is registered in the dial pulse counting relays 609; and it is then perforated by the tape perforator 780 in substantially the same manner as has been previously described. The principal alteration in the circuits involved pertain to the transfer relays R355 and R350. The former relay operates in response to the first impulse of the third digit and the latter relay operates at the end of the series of impulses of the third digit of the calling subscriber directory number. Thus at the end of the dialing of the third digit 1, the relay R350 operates and prepares, at its contacts 351, a circuit for operating the transfer relay R415 and, at its contacts 353, it prepares a point in the circuit for operating the calling station digit register 501 in accordance with the last digit of the calling subscriber directory number.

The fourth digit 1 of the calling subscriber directory number 1111 is now dialed and it controls the line relay R160 and the impulse control relay R230 in the manner previously described. However, this time the contacts 231 on the relay R230, in addition to completing the circuit for operating the pulse control relay R320, now transmits impulses over a circuit including the contacts 333, 343, 353, and 412 for operating the magnet M510 of the calling station digit register 501. The dial pulse counting relays 609, however, operate in substantially the same manner as has been previously described and the corresponding transfer relay R570, R580 or R590 locks in series with the particular operated counting relay so that the last digit of the calling subscriber directory number is also perforated on the tape associated with the tape perforator 780. It should be noted that the relay R415 operates under control of the contacts 322 on the relay R320 and that as soon as the contacts 322 are opened the transfer relays R415 and R410 lock in series to the grounded conductor C269. Relay R410, at its contacts 412 disconnects the impulsing circuit from the magnet M510 and, at its contacts 413, it prepares a point in the circuit for the matching relay R270.

At the present time the four digits of the calling subscriber number 1111 are respectively registered on the registers 401, 402, 403 and 501 and the corresponding digits have been perforated by the tape perforator 780 to produce a record of these digits.

*Verification of the calling subscriber directory number*

In response to the registration of the last digit of the calling subscriber directory number in the calling station digit register 501, a check is immediately made to determine whether or not digit registered therein is the same as the digit that has been registered in the calling station number marking relays 500. It will be recalled that the marking relays 500 were operated to indicate the position or station number of the calling station on the ten-party line during the time that the dial at that station transmitted the preliminary digit 0 to the toll ticket repeater 100.

In the present description it has been assumed that the calling station is the first station on a party line and that the calling station number marking relay R550 has been automatically operated to register the digit 1 as the last digit of the calling subscriber directory number. Inasmuch as the subscriber has actually dialed his own directory number and has operated the calling station digit register 501 to also register the last digit 1 of his directory number, the wiper 515 is in engagement with the associated first bank contact. As a result thereof, and during the interdigital pause, a circuit is completed which may be traced from ground, contacts 552 (relay R550 operated to register the digit 1) 543, 535, and 526 bank contact 1 engaged by the wiper 515, lower winding of the calling station matching relay R270, and contacts 413, to battery. The relay R270 now operates and locks itself in its operated position over a circuit including its upper winding and contacts 273 to the grounded locking conductor C269. It should be noted that the contacts 413, included in the initial operated circuit for the relay R270, are closed incident to the operation of the transfer relay R410 shortly after the last impulse of the fourth digit of the directory number has been dialed by the calling subscriber.

As a further result of the operation of the calling station matching relay R270, the contacts 271 are closed to complete a loop circuit for seizing the trunk selector 215 individually associated with the toll ticket repeater 100. This circuit may be traced over one path from the contacts 171, upper winding of the answer relay R210, resistor 233, upper right-hand winding of the repeater coil 190, and the −conductor C212 in the cable C214 extending to the trunk selector 215. The other branch of this loop circuit may be traced from the contacts 271 by way of the contacts 161 on the operated line relay R160, the lower right-hand winding of the repeater coil 190, and the +conductor C213 in the cable C214 extending to the trunk selector 215. The trunk selector 215 is of conventional construction and may, for example, be of the same type as the first selector 122 previously noted. The above described seizure of the trunk selector 215 conditions the latter switch to respond to the next digit dialed by the calling subscriber.

As described above, the last digit of the directory number of the calling station on a party line is automatically registered in the calling station number marking relays 500 and this number is compared with the fourth or last digit of the directory number as dialed by the calling subscriber and registered in the calling station digit register 501. If this comparison is satisfactorily made, the calling station matching relay R270 is operated to condition the trunk selector 215 to respond to subsequent digits dialed by the calling subscriber. It is also necessary at this time to verify the first three digits of the calling subscriber directory number, as dialed and registered in the registers 401 to 403, inclusive. In the present example, the first three digits 111 of the four-digit directory number 1111 identify the particular ten-party line of the calling subscriber substation. In order to verify the number of the calling subscriber line, the relay R270 upon operating, completes, at its contacts 272, a circuit including the contacts 741, winding of the verification start relay R360, and contacts 422, to ground. The start relay R360 operates over this circuit and applies ground potential, at its contacts 362, to the start conductor extending to the verifier allotter 373. Also, at its contacts 361, the start relay R360 removes the ground potential from the guard conductor terminating in a bank contact accessible to one of the wipers of the verifier allotter 373.

The verifier allotter 373 is schematically illustrated in block diagram form and it may, for example, be exactly the same as the allotter 1270 illustrated in Fig. 12 of the Peterson application, Serial No. 308,957, filed September 11, 1952. The verifier allotter 373 is common to all of the toll ticket repeaters, such as 100, provided in exchange A and it will search for and find the toll ticket repeater requiring its use, in order to selectively connect the particular toll ticket repeater to the verifier 372. Consequently, when the start conductor extending to the verifier allotter 373 is grounded, at the contacts 362, by the toll ticket repeater 100, the rotary switch (schematically illustrated) associated with the verifier allotter 373 will rotate its wipers until one of the wipers finds the ungrounded guard conductor. When this occurs the other wiper of the verifier allotter 373 will extend ground potential over the hold conductor individual to the toll ticket repeater 100 in order to complete a circuit, including contacts 772 and 743, for operating the verifier hold relay R420.

The verifier hold relay R420 upon operating interrupts, at its contacts 422, a point in the circuit for the verification start relay R360 which now restores to normal. Although the contacts 361 and 362 of the start relay R360 are now returned to the positions illustrated in the drawings, the verifier allotter 373 will be held in its operated position over the previously traced circuit including the winding of the verifier hold relay R420.

As a further result of the operation of the verification hold relay R420, at its contacts 421, it completes an obvious circuit for operating the verification connect relay R450. This relay is illustrated in the drawings as a single relay with three sets of ten make contacts each, but it will be appreciated, for example, that three relays may be provided with ten make contacts each to connect the thirty conductors from the bank contacts of the registers 401 to 403, inclusive, to the verifier 372. As a result of the operation of the verification hold relay R420, at its contacts 423, it completes an obvious circuit for operating the slow-to-release verification signal relay R760. This relay is provided to transmit a pulse of +70 volts from the battery 765 over the C conductor C197 to the calling subscriber line and if this signal is returned to the toll ticket repeater 100 through the verifier 372, it causes the operation of the verification check relay R750 to operate and indicate that the number dialed by the calling subscriber and registered in the registers 401 to 403, inclusive, and 501, is the actual number of the calling subscriber line. The operation of the calling line verifier 372 will now be described.

*Operation of the verifier 372*

Figure 3:
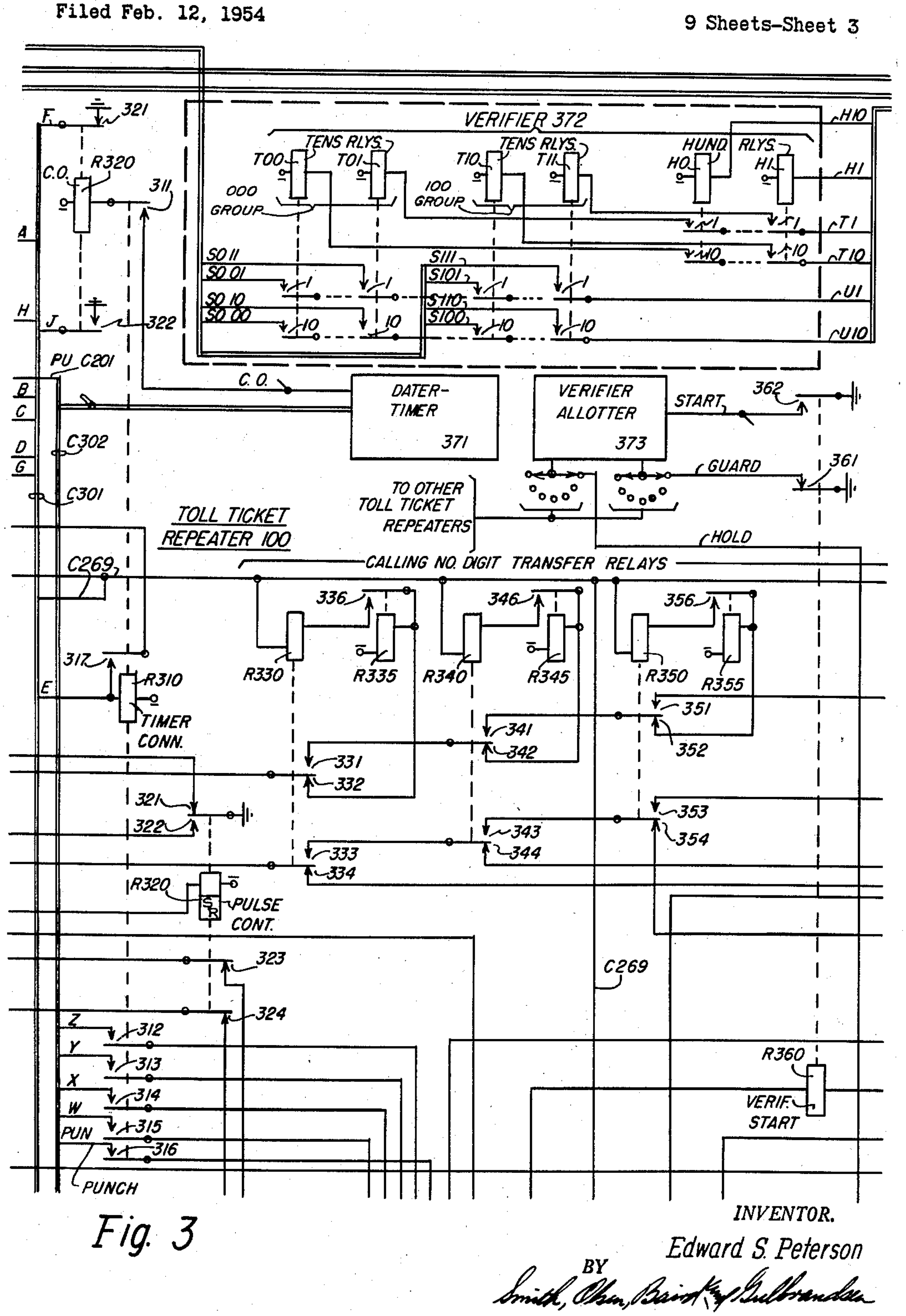
Figure 4:
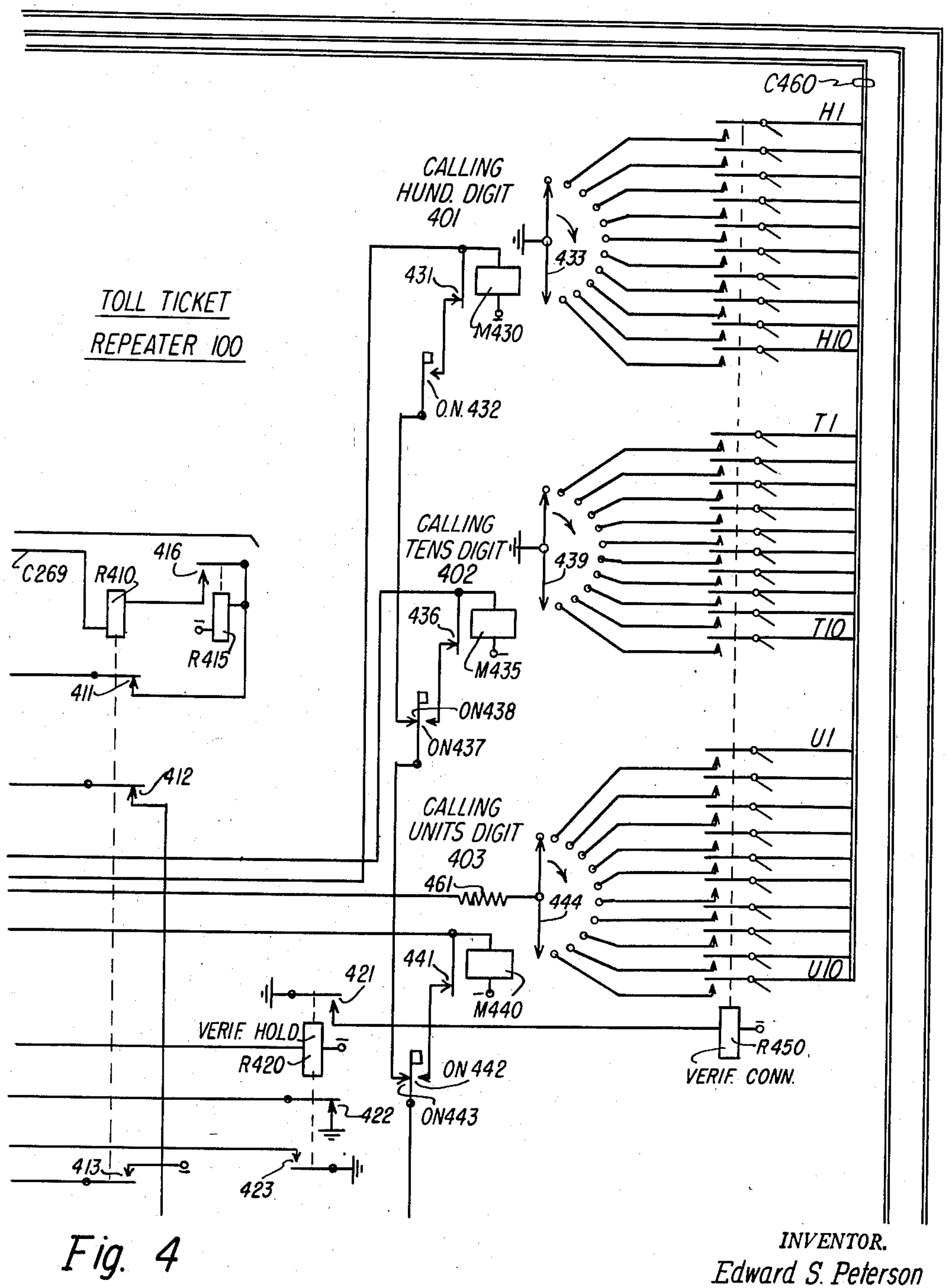
Figure 5:
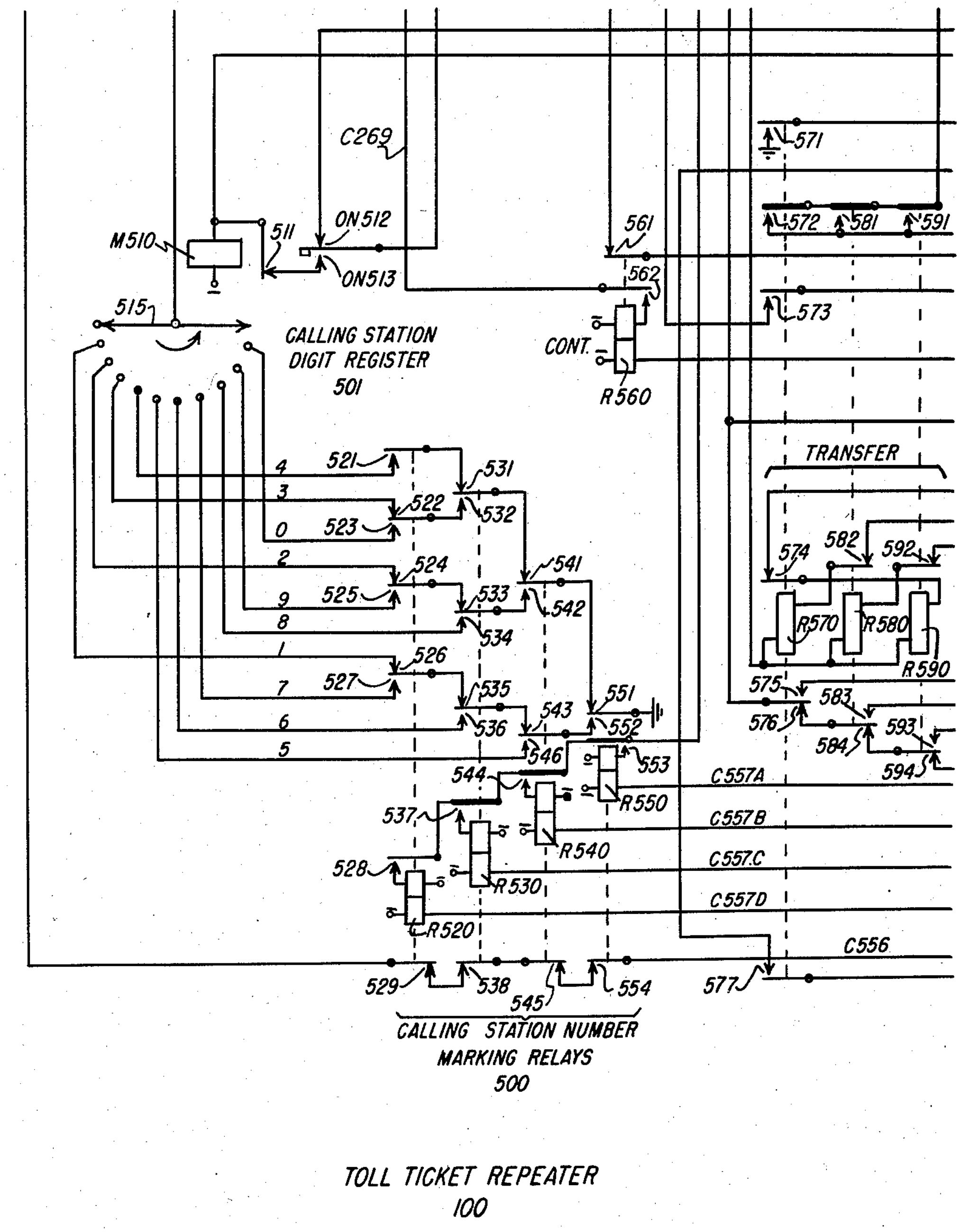
Figure 6:
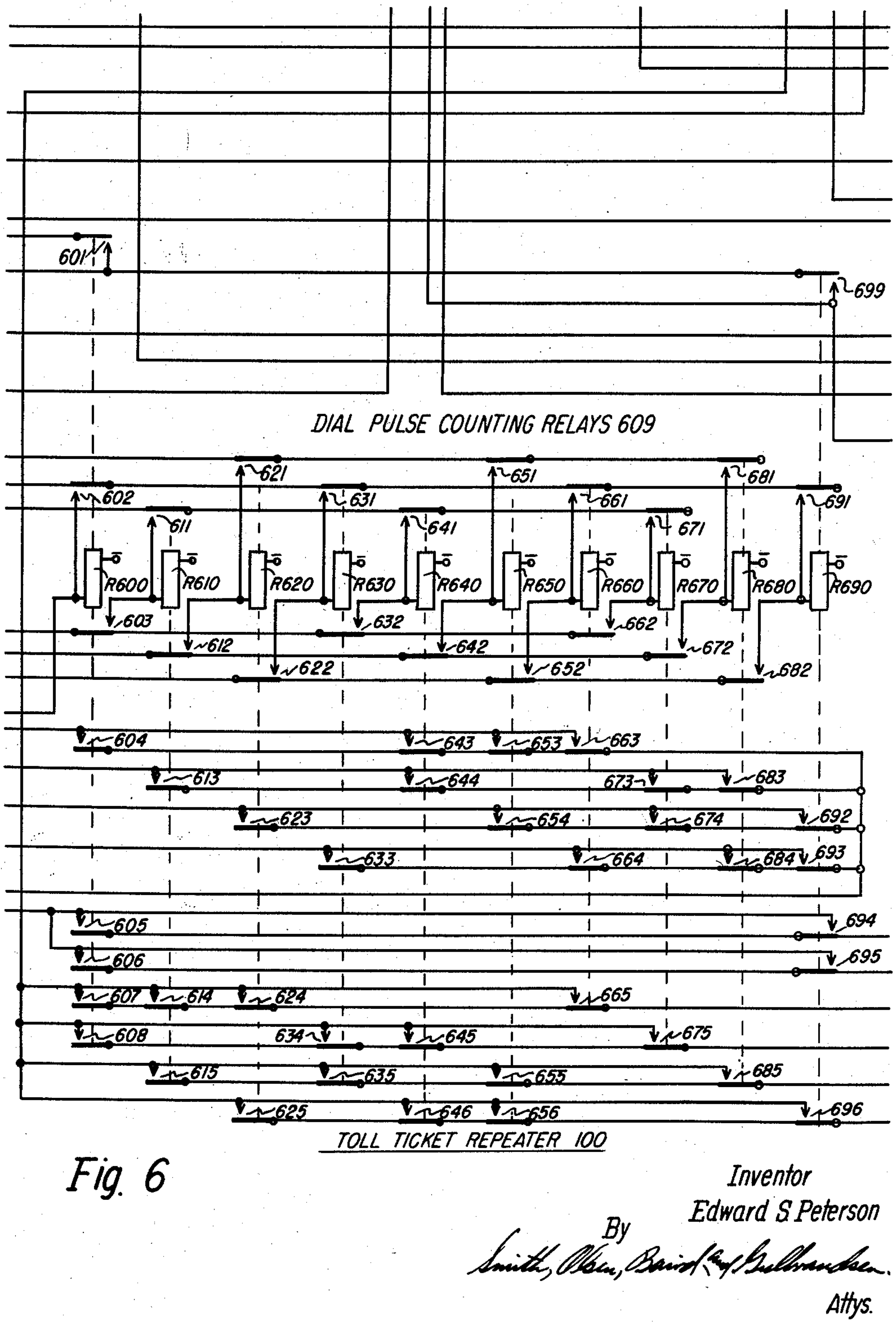

The calling line verifier 372 illustrated in Fig. 3 is common to all of the subscriber lines in exchange A and it is somewhat similar to the verifier 1301 shown in Fig. 13 of the previously mentioned Peterson application. However, the prior verifier is only equipped to handle the verification of 100 subscriber lines, whereas the verifier 372 is equipped to verify 1000 different subscriber lines. More specifically, the verifier 372 includes ten hundreds relays H–1 to H–9, inclusive, and H–0. These relays are respectively connected to the ten conductors H–1 to H–10, inclusive, in the cable C460 which terminate respectively in the contacts 1 to 10, inclusive, accessible to the wiper 433 on the calling hundreds digit register 401 by way of ten make contacts on the verification connect relay R450. Each of the above mentioned ten hundreds relays is provided with ten make contacts (1 to 10) and all of the armatures of the correspondingly numbered make contacts are multiply connected together. The ten armatures (1 to 10) on the hundreds relay H–1 are respectively connected to ten conductors T1 to T10, inclusive, in the cable C460 which terminate respectively in the contacts 1 to 10, inclusive, accessible to the wiper 439 on the calling tens digit register 402 by way of the make contacts on the verification connect relay R450.

Referring again to the verifier 372 it will be seen that the ten make contacts on the hundreds relay H–1 are connected respectively to the ten relays T–11 to T–19, inclusive, and T–10 in the 100 group. There are ten sets of such relays, each set constituting a separate hundreds group. The last ten relays, on the 000 group, are illustrated and are designated T–01 to T–09, inclusive, and T–00. These relays are respectively connected to the ten make contacts (1 to 10) on the H–0 relay in the group of hundreds relays. Each of the ten relays in the ten different hundred groups of ten relays is also provided with ten make contacts (1 to 10) and all of the armatures of the correspondingly make contacts are multiply connected together. The ten armatures (1 to 10) on the tens relay T–11 of the 100 group of tens relays are respectively connected to the ten conductors U1 to U10, inclusive, in the cable C460 and terminate respectively in the contacts 1 to 10, inclusive, accessible to the wiper 444 of the calling units digits register 403 by way of the make contacts on the vertification connect relay R450. The 1000 make contacts on the tens groups of tens relays are respectively connected to 1000 different S conductors which correspond respectively to each of the 1000 different subscriber lines in exchange A. In the present example, the calling subscriber at substation A1 is connected to the party line 111. Therefore, the make contact 1 on the tens relay T–11 in the 100 group is connected to the conductor S111 which terminates in the C conductor C103 individual to the subscriber line 111. All of the other C conductors individual to the remaining 999 subscriber lines are also connected by way of corresponding S conductors to corresponding make contacts on the different hundreds groups of tens relays in the verifier 372.

In the present description it has been assumed that the calling subscriber has registered the first three digits 111 of his directory number 1111 in the registers 401 to 403 inclusive. Consequently, the ground potential on the wiper 433 of the register 401 is connected by way of a make contact on the relay R450, and conductor H1 in the cable C460 in order to operate the H–1 relay in the hundreds group of relays. Also the wiper 439 of the register 402 extends ground potential by way of a make contact on the relay R450 to the T1 conductor in the cable C460 and then by way of the make contacts 1 on the operated H–1 relay in order to operate the tens relay T–11 in the 100 group of tens relays. The operated condition of the last mentioned relay closes its make contacts (1 to 10) to prepare circuits for the ten S conductors S111 to S119, inclusive, and S110. Finally, the calling units digit register 403 connects battery by way of the winding of the verification check relay R750, resistor 461, and wiper 444 in engagement with the first bank contact, make contact on the relay R450, conductor U1 in the cable 460, contact 1 on the operated T–11 relay in the verifier 372, and conductor S111 extending to the conductor C103 individual to the line circuit 120 of the calling subscriber line. Thus, it is apparent that the verifier 372 has been selectively operated in accordance with the digits that have been registered by the calling subscriber in the registers 401 to 403, inclusive, and that the S111 conductors individual to the calling subscriber line has been selected by the verifier 372.

As previously noted, the verification signal relay R760 is operated at substantially the same time that the verification connect relay R450 is operated. In other words, the verifier 372 is selectively operated by the registers 401 to 403, inclusive, to connect with the conductor S111 at substantially the same time that the verification signal relay R760 opens its contacts 764 and closes its contacts 763 to substitute the +70 volt battery 765 for a direct ground potential normally returned from the toll ticket repeater 100 to the calling subscriber line C conductor C103. This circuit may be traced from the plus 70 volt battery 765, contacts 763, conductor H in the cable D301, contacts 242, C conductor C197 in the cable C126, and then by way of corresponding C conductors (not shown) in the first selector 122, the line finder 121, and the line circuit 120, to the C conductor C103 individual to the calling subscriber line. The ground potential formally returned over this circuit from the contacts 764 on the verification signal relay R760 maintains the selector 122, the line finder 121 and the line circuit 120 in their operated positions, and the ground potential applied to the C conductor C103 marks the calling subscriber line busy to all of the local connectors in exchange A having access thereto. As soon as the plus 70 volt battery 765 is substituted for the direct ground potential it also maintains the above mentioned switching apparatus in their operated positions and it maintains the busy marking condition on the calling subscriber line. Finally, the +70 volt battery potential is connected to the C conductor C103 and the S111 conductor to complete, the previously traced circuit for operating the verification check relay R750. As previously noted, the winding of this relay is connected to battery potential which is the negative terminal of the conventional 50 volt exchange battery. The verification check relay R750 operates over the above described circuit in response to the application of the +70 volt battery potential to the C conductor C103 individual to the calling line. Attention is directed to the fact, however, that this relay does not operate from the direct ground potential normally applied to the C conductor C103.

As soon as the verification check relay R750 operates, it interrupts, at its contacts 752, a circuit which has been completed for the verification failure relay R770. This circuit is controlled at the contacts 762 at the same time that the verification signal relay R760 closes its contacts 763 to transmit the +70 volt battery potential to operate the verification check relay R750. In other words, before the verification check relay R750 operates, a circuit is completed by way of the contacts 762, 752 and 744, for energizing the slow-to-operate verification failure relay R750. Due to its slow-to-operate characteristics, the relay R770 does not normally have sufficient time to operate before the check relay R750 interrupts its circuit at the contacts 752. However, if the relay R750 fails to operate, for example, due to the fact that the calling subscriber has inadvertently dialed the digits of another subscriber's directory number, the verification failure relay R770 will have sufficient time to operate. In the event the relay R770 operates, it locks itself over a circuit including the contacts 744 and 773, to the grounded locking conductor C269. As a further result of the operation of relay R770, at its contacts 774, it applies ground potential to the verification alarm conductor C753 in order to operate a signal (not shown) to indicate the fact that the toll ticket repeater 100 is connected to a calling subscriber that has failed to dial the correct calling directory number. As a further result of the operation of relay R770, at its contacts 771, it connects the grounded locking conductor C269 to a circuit including the lower winding of the failure relay R130, so that the latter relay operates and locks itself over a circuit including its upper winding and the contacts 134, to the grounded conductor C269. As previously noted the failure relay R130, upon operating, transmits the busy tone signal on the conductor C152, by way of the contacts 131 and the + conductor C196 to indicate to the calling subscriber that the call cannot be completed, and it also completes, at its contacts 133, the circuit including the alarm conductor C153 in order to signal the exchange attendant in the manner previously described. The last mentioned signal normally indicates the failure of the calling subscriber to dial the preliminary digit 0 and it is used in conjunction with the verification alarm signal transmitted over the conductor C753 to indicate the fact that the calling subscriber has failed to correctly dial his own directory number. Finally, the relay R770, at its contacts 772, interrupts a point in the previously traced circuit for the verification hold relay R420 whereupon the latter relay restores to normal and the verification allotter 373 is released so that it may be utilized in connecting with another toll ticket repeater. Restoration of the relay R420 opens the circuit for the verification connect relay R450 so that the latter relay restores to normal and disconnects the verifier 372 from the registers 401 to 403, inclusive, in the toll ticket repeater 100. Also, at its contacts 423, the relay R420 interrupts the circuit for the verification signal relay R760 which also restores to normal to disconnect the +70 volt battery 765 from the previously traced circuit including the C conductor C103 of the calling subscriber line. As a precautionary measure, the failure relay R130 upon operating, at its contacts 132, places a shunt circuit around the contacts 161 on the line relay R160 to prevent impulses from being inadvertently transmitted to the trunk selector 215 in the event the calling subscriber actuates his dial in accordance with digits of a called number. Upon hearing the busy tone signal the calling subscriber will release the connection thus far established by hanging up his receiver or hand set.

It will be assumed in the present call that the verification check relay R750 operates and interrupts the circuit for the verification failure relay R770 before the latter relay has had sufficient time to operate and transmit the above described failure alarm signals. Consequently, the relay R750 will complete, at its contacts 751, a circuit including the contacts 761 for operating the verification disconnect relay R740. This relay locks itself over a circuit including its upper winding and the contacts 742, to the grounded locking conductor C269. Also at its contacts 741 the relay R740 interrupts an additional point in the circuit for the start relay R360 so that the latter relay will not reoperate when the verification hold relay R420 subsequently restores to normal. At its contacts 743, the relay R740 interrupts the circuit for the verification hold relay R420 so that the latter relay restores to normal to render the verifier allotter 373 available for use by other toll ticket repeaters. The circuits and apparatus controlled incident to the restoration of the relay R420 are the same as has been explained above in connection with the restoration of the hold relay R420 under control of the contacts 772 on the verification failure relay R770. Therefore, it will be recalled that the verification hold relay R420 opens the circuit, at its contacts 423, for the verification signal relay R760 and the latter relay restores to normal to again replace, at its contacts 764, the direct holding ground potential to the C conductors to hold the first selector 122, the line finder 121 and the line circuit 120 in their operated positions and to remove, at its contacts 763, the plus 70 volt battery potential applied to this circuit for verification purposes.

*Dialing the called subscriber directory number*

In the description of the operation of the system it has thus far been assumed that the calling subscriber at substation A1 has dialed the digit 0 into the first selector 122 to select the toll ticket repeater 100; has then dialed the preliminary digit 0 into the toll ticket repeater 100 to register the same in the relay R280 and to simultaneously register the station identifying or code digit of the calling subscriber number in the marking relays 500; and has then dialed the digits 1111 of the directory number of the calling station into the registers 401 to 404, inclusive, and 501 in the toll ticket repeater 100. Following the interdigital pause after the last digit 1 of the calling subscriber directory number, the calling subscriber will then dial the digit 0 identifying the called exchange B and then the four digits 2111 of the director number of the desired called subscriber substation in exchange B. It may be well to mention at this time, however, that during the interdigital pause following the last digit 1 of the calling subscriber directory number, the verification of the calling subscriber directory number, as dialed, takes place in the manner described above. The verification may or may not be completed before the calling subscriber dials one or more of the digits of the called exchange B and of the called subscriber directory number. The verification operation will not interfere with the dialing of subsequent digits by the calling subscriber and the dialing operation will not interfere with the verification operation.

In the previous description it was pointed out that the calling station matching relay R270 causes the seizure of the trunk selector 215 immediately after the calling subscriber dialed the last digit 1 of his directory number. Therefore, the calling subscriber may now dial the digit 0 identifying the called exchange B in order to control the line relay R160 which will accordingly restore and reoperate ten times. At the contacts 161, the line relay R160 interrupts the previously traced loop circuit including the − and + conductors C212 and C213, ten times and the trunk selector 215 accordingly operates its wiper set to the tenth level of its associated bank contacts. The trunk selector 215 then automatically rotates its wiper set over the selected level to search for an idle trunk repeater, such as 216, terminating an idle toll or trunk line, such as C217, extending to the exchange B.

As a further result of the ten impulses transmitted to the line relay R160, at its contacts 163, it operates and restores the impulse control relay R230 a corresponding number of times. The latter relay, at its contacts 232, again controls the sequential operation of the dial pulse counting relays 609 in the manner previously explained. Since ten impulses are transmitted to the counting relays 609, the relay R690 therein ultimately operates and locks itself in series with the transfer relay R570. During the interdigital pause following digit 0 identifying the called exchange B, the pulse control relay R320 again restores to normal and thereby causes the tape perforator 780 to be operated in the manner previously described to perforate the associated tape, in code form, in accordance with the digit 0 temporarily registered in the counting relay R690. As soon as this operation is performed, the counting relay R690 and the transfer relay R570 restore to normal and the tape perforator 780 advances its associated tape so that it is in condition to perforate subsequent digits dialed by the calling subscriber.

The calling subscriber may now dial the called subscriber directory number 2111 in the same manner as has been described above and each of the digits will be repeated by the contacts 161 by way of the trunk selector 215, the trunk repeater 216 and the toll or trunk line C217 to the incoming selector 825 in the called exchange B. Furthermore, the line relay R160, at its contacts 163, will repeat impulses corresponding to the digits 2111 to the impulse control relay R230 and the latter relay, at its contacts 232, will repeat these impulses to the counting relays 609. Furthermore, each of the digits 2111 of the called subscriber directory number, as sequentially registered on the counting relays 609, is successively perforated on the tape associated with the tape perforator 780 in the same manner as has been previously described.

Referring now to Fig. 8 it will be seen that the trunk or toll line C217 terminates in the incoming selector 825. This selector responds to the first digit 2 of the called subscriber four digit directory number 2111 and it raises its wiper set to the second level and then rotates the wipers over the contacts of the selected second level to search for an idle connector, such as 824, in the 200 group of connectors. The second and third digits 11 of the called subscriber directory number 2111 control the connector 824 to actuate its wiper set to select the first contact in the first level of the associated contact banks terminating the called subscriber line and the last digit 1 selectively controls the connector 824 to transmit a ringing signal having a frequency that actuates only the ringer at the substation B1 having the directory number 2111 in order to signal the called subscriber thereat.

As soon as the called subscriber answers the call by removing his receiver, a direct current loop circuit is completed to the connector 824 in order to terminate the ringing signal in a conventional manner. Also, the connector 824 in response to the answer of the call by the called subscriber, transmits an answering signal back over the established connection to the repeater 100 in order to reverse the direction of the current flow through the upper winding of the answer relay R210. The reversal of the current flow through the upper winding of the answer relay R210 causes the relay to operate and close its contacts 211 in order to complete a circuit, including conductor A in the cable C301, for operating the conversation time control relay R710. The calling and called subscriber substations are now interconnected and the subscribers thereat may converse with each other.

*Controlling the tape perforator 780 in response to the completed conversation*

As soon as the above described connection is completed between the calling and called subscribers, the answer relay R210 in the toll ticket repeater is operated and at its contacts 211 it immediately completes a circuit including the conductor A in the cable C301 in order to operate the conversation time control relay R710 in the above described manner. This relay upon operating locks itself, by way of its upper winding and its contacts 717, to the COM conductor in the cable C301 and the locking ground conductor C269. Also the ground potential connected to the upper winding of the relay R710 in order to lock the same in its operated position, also completes the operating circuit for the conversation time control relay R720. These two relays remain in their operated position during the conversation time of the established connection and they are released when the locking ground potential is removed from the conductor C269 under control of the dater-timer 371, as will be explained hereinafter.

As soon as the relay R710 operates it also completes, at its contacts 715, a circuit for operating the slow-to-operate relay R730. Due to the slow-to-operate characteristics of the last mentioned relay a circuit is completed by way of the contacts 715 and 731 for operating the slow-to-operate punch relay R220 before the relay R730 has had sufficient time to operate and open the contacts 731. The punch relay R220, although it is somewhat slow to operate, will close its contacts 121 before the relay R730 opens its initial operating circuit at the contacts 731 and thereby applies ground potential to the punch conductor C781 extending to the tape perforator 780. The punch magnet (not shown) in the tape perforator 780 operates as soon as the conductor C781 is grounded to perforate the associated tape but at the present time the marking conductors C782W to C782Z, inclusive, are ungrounded. Therefore, the punch magnet in the tape perforator 780, while performing its normal function, does not actually perforate the associated tape and thereby merely spaces the tape an additional step to provide a "SPACE" function thereon. Immediately after the punch relay R220 has controlled the tape perforator 780 in the manner described above, the slow-to-operate relay R730 opens its contacts 731 in order to restore the punch relay R220, and consequently, the punch magnet in the tape perforator 780 is also restored. The relay R730 now remains in its operated position under control of the contacts 715 on the operated relay R710.

As a further result of the operation of relay R710, at its contacts 716, it completes a circuit whereby the time pulse conductor C736 from the dater-timer 731 transmits short ground pulses at the rate of one pulse every six seconds to the dial pulse counting relays 609. The first ground pulse received over this conductor, after the relay R710 has been operated, is transmitted by way of the contacts 716, 253, 576, 584 and 594 in order to operate the first counting relay R600. At its contacts 605 and 606 the counting relay R600 prepares points in marking circuits including contacts 726 and 728 for marking the digit 1 on the marking conductors C782W and C782X extending to the perforator magnets (not shown) in the tape perforator 780. As soon as the first pulse is removed from the time pulse conductor C736 the counting relay R600 locks itself in series with the transfer relay R570 over the previously traced circuit including the contacts 602, 582, 289 and 222. At its contacts 577, the transfer relay R570 connects the marking circuit including the contacts 605 and 606 on the counting relay R600, to ground, at the contacts 712 on the operated relay R710 in order to mark the digit 1, in code form, on the conductor C782W and C782X. Also a circuit is now completed by the transfer relay R570 for again operating the punch relay R220. This circuit may best be traced from battery through the winding of the punch relay R220, contacts 282, 573, 601, 561 and 211', to ground. At its contacts 221, the punch relay R220 again completes the circuit for including the punch conductor C781 for operating the punch magnet (not shown) in the tape perforator 780 so that the digit 1 marked in code form on the above mentioned marking conductors is perforated on the associated tape in order to charge the calling subscriber with one minute of conversational time within six seconds after the connection is answered at the called subscriber substation. The contacts 222 on the punch relay R220 are also opened in response to the operation of the relay, but these contacts are adjusted so that they do not open until after the contacts 221 have been closed to control the tape perforator 780. Contacts 222 will interrupt the locking circuits for the relays R570 and R600 in order to restore these relays before the next time pulse is received over the conductor C736 from the dater-timer 371.

It was pointed out above that the operation of the punch relay R220 completed the circuit for controlling the punch magnet in the tape perforator 780. It should be noted, however, that at the contacts 221 a circuit is also completed by way of the contacts 721 on the operated relay R720 in order to operate the control relay R560. The latter relay upon operating, locks itself by way of its upper winding and the contacts 562 to the locking ground conductor C269. Also at its contacts 561 the relay R560 opens a point in the previously traced circuit for operating the punch relay R220 at the end of the first time pulse received by the counting relay R600 from the dater-timer 371. In other words, the first counting relay R600 may now be controlled to count a time pulse received from the dater-timer 371 without controlling the punch relay R220. From the foregoing it will be appreciated that the first time pulse is perforated by the tape perforator 780, in code form, as the digit 1, within six seconds after the call has been answered. Thereafter, the digit 1 will be perforated, in code form, each time ten successive six second pulses are counted by the counting relays 609 so that each minute of conversational time, after the first six seconds or less, will be perforated as a digit 1 by the tape perforator 780.

Six seconds after the first pulse is received over the conductor C736 another pulse will be received and it will control the counting relays R600 in the same manner as has been described above. However, this pulse will not control the tape perforator 780 due to the fact that the control relay R560 is now in its operated position. The next nine pulses received over the conductor C736 from the dater timer 371, will successively control the counting relays R610 to R690, inclusive, thereby counting one full minute of conversational time. As soon as the tenth counting relay R690 operates, it prepares, at its contacts 694 and 695, the marking circuits for the marking conductors C782W and C782X. Also, at the contacts 699, the relay R690 prepares a point in a circuit, including ground at the contacts 716', for operating the punch relay R220. At the end of the pulse that operated the relay R690, the relay locks itself in series with the first transfer relay R570 in the manner previously described and, at its contacts 573, the latter relay completes the circuit prepared at the contacts 699, in order to operate the punch relay R220. As a further result of the operation of the transfer relay R570, at its contacts 577, it applies ground potential, by way of the contacts 694 and 695, to the marking conductors C782W and C782X in order to operate the perforate magnets in the tape perforator 780 in accordance with the digit 1. The punch relay R220, in turn, completes the previously described circuit including the punch conductor C781 whereby the punch magnet in the tape perforator 780 is controlled to again perforate the tape in accordance with the digit 1. Each minute of conversation time will cause the perforator 780 to perforate the tape in accordance with the digit 1 whereby the total conversation time of any telephone connection may be determined by counting the number of digit 1 perforations appearing on the tape following the "Space" function perforated thereon.

The conversation between the calling subscriber at substation A1 and the called subscriber at substation B1 may continue as long as desired and the tape perforator 780 will be controlled by the counting relays 609, each minute, after the first six seconds or less, to accumulate perforations in accordance with the digit 1. As soon as the calling subscriber at substation A1 replaces his receiver or handset to release the connection, the line relay R160 immediately restores and it interrupts, at its contacts 162, the circuit for the release relay R250 which slowly restores to normal. As a further result of the restoration of the line relay R160, at its contacts 161, it interrupts the loop circuit extending to the trunk selector 215 and the trunk repeater 216 in order to restore the last-mentioned switching apparatus. It should be understood that the release of the connection by the called subscriber at substation B1, before the calling subscriber at substation A1, will merely cause the current to be reversed in the upper winding of the answer relay R210 so that the latter relay restores to normal. The restoration of the relay R210, however, performs no control when the called subscriber releases the connection before the calling subscriber. It should also be understood that when the calling subscriber causes the release of the trunk selector 215 and the trunk repeater 216, the latter repeater will control the restoration of the operated switching apparatus in the called exchange B, unless the connector, such as 824, is of the last-party release type, in which event the switching apparatus in exchange B will restore to normal under control of the connector by the last party to release the connection.

Referring now to the release relay R250, it will be seen that as soon as it restores to normal it interrupts, at its contacts 252, the circuit for the local hold relay R240 which also restores to normal to interrupt, at its contacts 244, the initial operating circuit for the hold relay R260. The latter relay, however, is now locked in its operating position over the previously traced circuit including the conductor G in the cable C301, contacts 719' on the operated relay R710, conductor F in the cable C301, to ground at contacts 321 on the cut-off relay R320. As a further result of the restoration of the release relay R250, at its contacts 253, it interrupts a point in the previously described circuit whereby the counting relays 609 are controlled by the time pulses applied to the conductor C736. Consequently, no additional time pulses can be counted by the counting relays 609. Operated ones of the counting relays 609 and the associated transfer relays will subsequently be released under control of the restoration of the 0 digit dial relay R280.

Referring again to the local hold relay R240, it will be seen that as soon as this relay restores to normal it opens its contacts 242 in order to disconnect the holding and busy marking ground potential from the control conductor C197. The removal of ground potential from this conductor restores the preceding switching apparatus, including the first selector 122, line finder 121 and line circuit 120, to normal so that this apparatus may be utilized in another telephone connection. As a further result of the restoration of relay R240, it closes its contacts 241 in order to prepare a point in a circuit for again applying the resistance battery potential, by way of the contacts 261 and resistor 262, to the control conductor C197. However, this potential is withheld from the conductor C197 until the toll ticket repeater 100 is again available for use in another connection. Thus, the toll ticket repeater 100, although released from the switching apparatus utilized in the telephone connection described above, is actually withheld from further service until the resistance battery is again applied to the conductor C197 by the restoration of relay R260.

Referring again to the local hold relay R240, it will be seen that as soon as this relay restores to normal it prepares, at its contacts 243, a point in the circuit including the pick-up conductor C201 for controlling the timer connect relay R310. In other words, the toll ticket repeater 100 is now prepared to receive information that is accumulated and stored in the dater-timer 371 and to perforate this information on the tape perforator 780. In the present system it is assumed that the dater-timer 371 is of the type disclosed, for example, in the Ostline Patent No. 2,543,983 granted March 6, 1951. In this patent the date and time unit is arranged so that it will mark four marking conductors, such as the conductors C782W to C782Z, inclusive, in accordance with the tens units digits indicative of the month of the year, tens and units digits indicative of the day of the month, tens and unit digits indicative of the hour of the day, and tens and units digits indicative of the minute of the hour. For the purpose of the present description it will be assumed that the dater-timer 371 is of the type disclosed in the above mentioned Ostline patent and that it is arranged to sequentially mark the conductors C782W, C782X, C782Y and C782Z in accordance with the eight different items of information noted above and that it is also arranged to apply a short pulse of ground potential to the punch conductor C781 each time the four marking conductors have been marked with an item of information.

Each time the dater-timer 371 is in condition to sequentially mark the conductors extending to the tape perforator 780 with the first of the above mentioned items of information, it transmits a short ground pulse over the pick-up conductor C201. If any toll ticket repeater, such as 100, is in condition to receive the pick-up pulse a circuit will be completed for its timer connect relay, such as R310. The toll ticket repeater 100 is now in condition to respond to the pickup pulse on the conductor C201 and it is, accordingly, transmitted by way of the contacts 243, conductor D in the cable C301, contacts 719, conductor E in the cable C301, and the winding of the timer connect relay R310, to battery. This relay now operates and immediately locks itself in its operated position over a circuit including the contacts 317, conductor G in the cable C301, contacts 719′, conductor F in the cable C301, and ground at contacts 321. At the contacts 311, the relay R310 prepares a point in the circuit whereby the cut-off relay R320 is subsequently controlled by the dater-timer 371 after the date and time information has been transmitted and perforated by the tape perforator 780. At the contacts 312 to 315, inclusive, the relay R310 connects the marking conductors C782W to C782Z, inclusive, from the tape perforator 780 to the corresponding WXYZ conductors extending to the dater-timer 371. Finally, at its contacts 316, the relay R310 connects the punch conductor C781 from the tape perforator 780 to the corresponding punch conductor extending to the dater-timer 371.

Shortly after the pick-up conductor C201 is momentarily grounded to operate the timer connect relay R310, the dater-timer 371 will mark the conductors C782W to C782Z, inclusive, in accordance with the tens digit of the month and a short ground pulse will thereafter be applied to the punch conductor C781 in order to control the tape perforator 780 to perforate, in code form, the tens digit of the day of the month. The tape perforator 780 will thereafter be controlled, in the order named, to perforate the units digit of the month, the tens digit of the day, the units digit of the day, the tens digit of the minute and the units digit of the minute so that the month, day, hour and minute that the particular recorded call is terminated is perforated in code form on the tape associated with the tape perforator 780. Immediately after the last item of information has been perforated in the manner described above, ground potential will be applied to the cut-off conductor CO by the dater-timer 371 in order to complete a circuit, including the contacts 311, to operate the cut-off relay R320. In other words, the dater-timer 371 has completed its cycle of operation which starts with the pick-up pulse on the conductor C201 and ends with the cut-off pulse on the cut-off conductor CO and in between these two pulses the eight items of information pertaining to the month, day, hour and minute will be perforated by the tape perforator 780.

The first control performed incident to the operation of the cut-off relay R320 causes the tape perforator 780 to perforate an end-of-message code signal on the associated tape. This operation is controlled over a circuit including the contacts 322 on the cut-off relay R320 and the conductor J in the cable 301 in order to operate the end-of-message relay R790. The latter relay, at its contacts 791 to 794, inclusive, applies ground potential to all of marking conductors C782W to C782Z, inclusive. Finally, at its contacts 795, which are last to close, the relay R780 applies ground potential to the punch conductor C781 whereby a four hole code is perforated on the associated tape by the tape perforator 780 to indicate the end of the toll ticket containing the information pertaining to the previously described connection established between the calling subscriber at substation A1 and the called subscriber at substation B1.

The second control exercised in response to the operation of the cut-off relay R320 results in the complete release of all of the apparatus included in the toll ticket repeater 100. Thus at the contacts 321 the relay R320 removes ground potential from the conductor F in the cable C301, thereby interrupting the multiple holding circuit for the hold relay R260 and the timer connect relay R310. The relay R310 now restores to normal to disconnect the conductors C782W to C782X, inclusive, and the punch conductor C781 extending to the tape perforator 780 from the dater-timer 371. As a further result of the restoration of relay R310, at its contacts 311, it interrupts the circuit for the cut-off relay R310 so that the latter relay restores to normal. Normally, the relays R260 and R310 will restore to normal before the cut-off relay R320 restores in order to prevent the re-establishment of the locking circuit for the slow-to-release hold relay R260 before the latter relay restores.

The hold relay R260 upon restoring removes, at its contacts 264, the ground potential from the locking conductor C269 in order now to restore all relays in the toll ticket repeater 100 that have been operated and locked to this conductor. At the contacts 265, the relay R260 interrupts the locking circuit for the calling station number marking relays 500 in order now to restore any operated relays therein. At its contacts 268, the relay R260 completes a self-interrupting stepping circuit for each of the registers 501, 403, 402 and 401 whereby each of the registers will be controlled to restore the associated wipers to the illustrated home contact positions. In this connection it should be noted that each of the above registers is provided with off-normal contacts, such as the contacts ON512 and ON513 provided on the calling station digit register 501. With the wiper 515 in the illustrated home contact position, the contacts ON512 are normally closed and the contacts ON513 are normally open. However, as soon as the wiper 515 is moved away from its home contact position to engage any other contact in the associated contact bank, the contacts ON512 are opened and the contacts ON513 are closed. This same control is performed in connection with the off-normal contacts associated with each of the other registers 401 to 403, inclusive. Therefore, the ground potential at the contacts 268 is now extended by way of the off-normal contacts ON513, the self-interrupting contacts 511 and the winding of the magnet M510 of the calling station digit register 501, to battery. The magnet M510 is now intermittently operated and restored under control of its contacts 511 to advance the wiper 515 step-by-step until the wiper returns to the illustrated home contact position. When this occurs the off-normal contacts ON513 are opened to terminate further control of the magnet M510 and to transfer the circuit by way of the contacts ON512, ON442, self-interrupting contacts 441, and the winding of the magnet M440 on the calling units digit register 403, to battery. The magnet M440 is now self-interruptedly operated until its wiper 444 is advanced to the illustrated home contact position. When this occurs the off-normal contacts ON442 are opened and the off-normal contacts ON443 are closed to transfer the stepping circuit to the magnet M435 of the calling tens digit register 402. This magnet is also self-interruptedly operated until its wiper 439 is advanced to the illustrated home contact position, at which time the contacts ON437 are opened and the contacts ON438 are closed to transfer the stepping circuit to the magnet M430. Consequently, the magnet M430 of the calling hundreds digit register 401 is self-interruptedly operated until its wiper 433 is advanced to the illustrated home contact position. When this occurs the contacts ON432 are opened to terminate further control of the magnet M430.

The toll ticket repeater 100 is now fully restored to normal and is available for use in recording another toll ticketed call from exchange A to any other exchange in the telephone network. The fact that the toll ticket repeater 100 is available for further use is indicated to the selector 122, and any other selector having access thereto, by the replacement of the resistance battery potential on the C conductor C197 in the cable C126 over the circuit including the contacts 241 and 261, and the resistor 262.

It will be apparent from the foregoing description that the tape perforator 780 has been controlled to perforate the associated tape, in code form, with the following items of information in the order named:

(1) Directory number 1111 of the calling station A1.
(2) Digit 9 identifying the called exchange B.
(3) Directory number 2111 of the called station B1.
(4) Space.
(5) Digit 1 repeated for each minute of conversation.
(6) Tens digit of month.
(7) Units digit of month.
(8) Tens digit of day.
(9) Units digit of day.
(10) Tens digit of hour.
(11) Units digit of hour.
(12) Tens digit of minute.
(13) Units digit of minute.
(14) Four hold code indicative of the end of the ticket.

*Call from exchange B to exchange A*

As previously noted the switching apparatus provided in exchange B is substantially identical to the switching apparatus provided in exchange A. Consequently, when the calling subscriber, for example, at substation B1 (Fig. 8) removes his receiver to initiate a toll ticketed call to a called subscriber in another exchange, the line circuit 820, the distributor 823 and the line finder 821 function in the same manner as the corresponding equipment in exchange A to connect the calling subscriber line to the first selector 822. The calling subscriber may now dial the preliminary digit 0 to further extend the connection to a toll ticket repeater, such as 800, which is identical to the toll ticket repeater 100 in exchange A. The second preliminary digit 0 is now dialed into the toll ticket repeater 800 in order to condition the same for further toll ticketing operation and a register therein the position of the particular calling station on the calling party line. The last-mentioned position of the calling station is governed in accordance with cam 832 and the high point 833 thereon that connects ground potential to the two conductors C818 and C819 of the calling subscriber line to control the operation and registration of the calling station position in the marking relays, provided in the toll ticket repeater 800, which correspond to the marking relays 500 in the ticket repeater 100.

Figure 7:
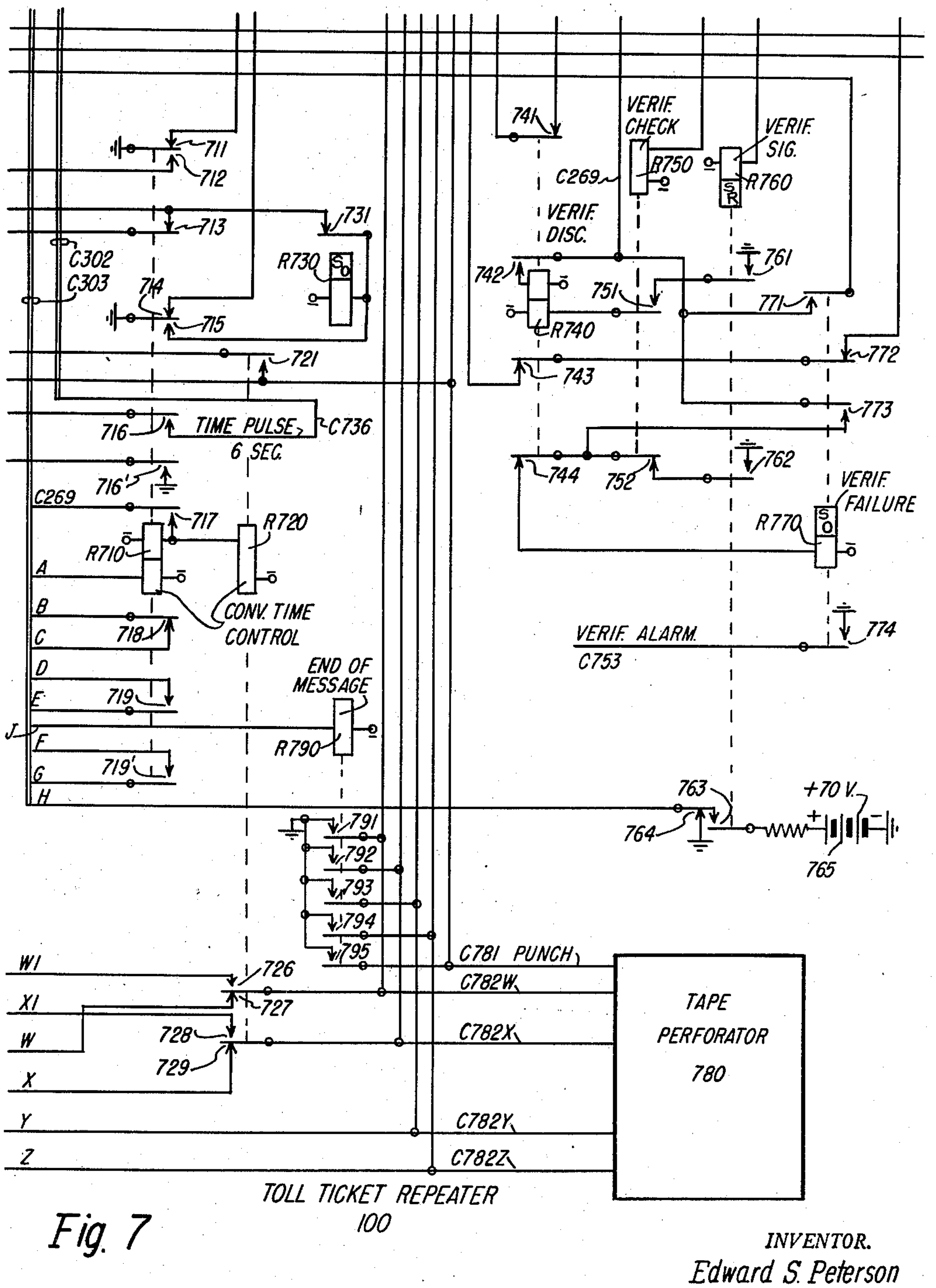

The calling subscriber may now dial his own directory number comprising the digits 2111, whereupon these digits will be perforated on the tape perforator individual to the toll ticket repeater 800 and which is exactly the same as the tape perforator 780 (Fig. 7). Also these digits will cause the verifier allotter 873 and the verifier 872, provided in exchange B to function in the same manner as the corresponding apparatus provided in exchange A to determine whether or not the calling subscriber has correctly dialed and registered his own directory number.

The calling subscriber now dials the digit 8, for example, identifying the called exchange A and this digit is also perforated on the tape perforator associated with the toll ticket repeater 800 and it controls the trunk selector 815 to select an idle trunk in the eighth level extending to the trunk repeater 816. Thereafter, the calling subscriber dials the four digits of the directory number of the called subscriber in exchange A. These digits are also perforated by the tape perforator associated with the toll ticket repeater 800 and they are repeated by way of the trunk repeater 816 and the trunk or toll line C817 to the switching apparatus in exchange A. In exchange A, the first digit of the four digit directory number controls the incoming selector 125 so that the latter selector will select an idle trunk C127, for example, extending to an idle connector, such as the connector 124. The second and third digits of the called subscriber directory number control the connector 124 so that its wipers will select the desired called subscriber line and the last digit of the directory number controls the connector 124 to transmit the appropriate ringing current to signal the desired called subscriber substation.

The remaining operations involving the above toll ticketed call are identical to those described previously. It will therefore be understood that the tape perforator individual to the toll ticket repeater 800 will be controlled to perforate a code, indicative of the digit 1, within six seconds after the called subscriber answers the call and it will perforate the digit 1 for each succeeding minute of conversation time. It should be noted, however, that a "Space" character function is perforated by the tape perforator as a result of the called subscriber answering the call in order to separate the last digit of the called subscriber directory number and the first digit 1 of the conversation time.

When the calling and called subscribers release the above toll ticketed connection the tens and units digits of the month, day, hour, and minute will be perforated on the associated tape under control of the dater-timer 871 and, thereafter, a four-hole code indicative of the end of the toll ticket for the particular call will also be perforated. All of the switching apparatus utilized in the above toll ticketed call is then released and rendered available for use in other calls in the same manner as has been explained previously in connection with the operation of the switching apparatus in extending a call from exchange A to exchange B.

While one embodiment of the invention has been disclosed and described, it will be understood that various modifications may be made therein which are within the true spirit and scope of the invention.

What is claimed is:

1. In an automatic telephone system, a first exchange including first switching apparatus and a first station identified by a first assigned plural digit directory number, a second exchange including second switching apparatus and a second station identified by a second assigned plural digit directory number, a repeater in said first exchange, a tape perforator individual to said repeater, an impulse counting device in said repeater, a calling device at said first station controlled by the subscriber thereat for operating said first switching apparatus to extend a connection from said first station to said repeater, a register, a line relay in said repeater directly controlled by said calling device for operating said register to register the individual digits of said first station directory number and for repeating corresponding series of impulses to said impulse counting device, a calling station directory number verifier in said first exchange, means controlled in response to said registration of said first station directory number in said register for operating said verifier to determine whether or not said registered first station directory number corresponds to the assigned directory number of said first station, said line relay in said repeater also being directly controlled by said calling device for repeating the individual digits of said second station directory number to said second exchange switching apparatus and for repeating correspondingg series of impulses to said impulse counting device, said impulse counting device being selectively operated to count each of said series of impulses corresponding to each of the individual digits of said first station directory number and to count each of said series of impulses corresponding to each of the individual digits of said second station directory number, means in said repeater controlled in response to the counting of each series of impulses by said impulse counting device for marking to said tape perforator the corresponding digit, and means in said repeater controlled by each of said markings for operating said tape perforator to record on an associated tape the corresponding digit, whereby said tape perforator is operated to record the individual digits of said first station directory number and the individual digits of said second station directory number, said second switching apparatus being operated by the digits of said second station directory number repeated thereto to complete a connection from said first station to said second station.

2. In an automatic telephone system comprising a first exchange provided with first switching apparatus and a first station assigned an individual plural digit directory number, a second exchange provided with second switching apparatus and a second station assigned an individual plural digit directory number, a repeater in said first exchange, a calling device at said first station for operating said first switching apparatus to extend a connection from said first station to said repeater, first and second and third registers in said repeater, first impulse responsive means in said repeater directly controlled by said calling device for operating said first register to register a preliminary fixed digit therein and for simultaneously operating said second register to register a reference digit therein which is indicative of the last digit in said first station plural digit directory number, a recorder individual to said repeater, second impulse responsive means in said repeater selected in response to said registration of said preliminary fixed digit in said first register and directly controlled by said calling device to operate said third register to register said first station plural digit directory number and simultaneously to operate said recorder to record the digits of said first station plural digit directory number, a verification unit in said first exchange, means jointly controlled by said registration of said reference digit in said second register and by said registration of a corresponding last digit in said first station plural digit directory number in said third register for associating said verification unit with said repeater, means in said vertification unit operated in accordance with the digits preceding the last digit in said plural digit directory number registered in said third register for determining whether the digits preceding the last digit in said plural digit number registered in said third register correspond to the digits preceding the last digits in said plural digit directory number assigned to said first station, impulse repeating contacts controlled by said second impulse responsive means, means governed by said jointly controlled means for rendering said impulse repeating contacts effective to repeat impulses corresponding to the digits of said second station plural digit directory number to said second exchange switching apparatus, said second impulse responsive means being thereafter controlled by said calling device to operate said recorder to record the digits of said second station plural digit directory number and to control said impulse repeating contacts to repeat impulses corresponding to the digits of said second station plural digit directory number to said second exchange switching apparatus so as to operate said second exchange switching apparatus to complete a telephone connection from said first station to said second station, and blocking means operated by said verification unit in response to a determination that the digits preceding the last digit in said plural digit number registered in said third register do not correspond to the digits preceding the last digit in said plural digit directory number assigned to said first station for rendering said impulse repeating contacts ineffective to repeat impulses corresponding to the digits of said second station plural digit directory number to said second exchange switching apparatus.

3. The telephone system set forth in claim 2, and furter comprising a conductor having a tone signal thereon, and means controlled by operation of said blocking means for selecting said conductor to transmit said tone signal thereon to said first station so as to indicate that said telephone connection cannot be completed therefrom to said second station.

4. A repeater for an automatic telephone system comprising an incoming channel and an outgoing channel, a chain of impulse counting relays operative to count a series of impulses transmitted thereto and corresponding to a digit, impulse receiving means controlled over said incoming channel by a series of impulses corresponding to a digit for transmitting a corresponding series of impulses to said counting relays, a recording device, means controlled by said counting relays in response to the counting of the series of impulses of a predetermined preliminary digit for conditioning said recording device to record digits marked thereto, means thereafter controlled by said counting relays in response to the counting of the series of impulses corresponding to each digit of a first plural digit number and of the series of impulses corresponding to each digit of a second plural digit number for successively marking to said recording device the digits of said first plural digit number and the digits of said second plural digit number, means controlled in response to the counting by said counting relays of the series of impulses corresponding to the last digit of said first plural digit number for controlling said impulse receiving means to repeat each series of impulses corresponding to each digit in said second plural digit number over said outgoing channel.

5. The repeater set forth in claim 4, and further comprising a time pulse conductor having time pulses impressed thereon, means controlled after the series of impulses corresponding to the last digit in said second plural digit number is repeated over said outgoing channel for connecting said time pulse conductor to said impulse counting relays so that said impulse counting relays count the impulses impressed on said time pulse conductor, and means controlled by said impulse counting relays each time a predetermined number of time pulses are counted thereby for marking to said recording device a predetermined digit.

6. The repeater set forth in claim 4, wherein said counting relays mark each digit to said recording device in code via a group of code marking conductors extending therebetween.

7. In a telephone system, a calling station on a calling party line, wherein a calling number is assigned thereto including line identity digits and a station identity digit, a repeater connected to said calling party line and comprising an incoming channel and an outgoing channel, means for receiving digits transmitted over said incoming channel, a station register, means controlled by said receiving means in response to the transmission of a preliminary fixed digit over said incoming channel for registering a station digit in said station register that is indicative of a particular calling station on a calling party line, a calling register, a recorder, means controlled by said receiving means in response to the subsequent transmission of a calling number over said incoming channel for registering said calling number in said calling register and for operating said recorder to record said calling number, a verification unit, means for comparing the station digit registered in said station register with the station identity digit of said calling number registered in said calling register and controlled in response to a correspondency therebetween for seizing said verification unit, means for repeating digits over said outgoing channel, means governed by the seizure of said verification unit for operating the same to compare the line identity digits of said calling number registered in said calling register with the line identity digits assigned to said calling party line and controlled in response to a correspondency therebetween for preparing said repeating means, and means controlled by said receiving means in response to the subsequent transmission of a called number over said incoming channel for operating said recorder to record said called number and for operating said prepared repeating means to repeat the digits of said called number over said outgoing channel.

References Cited in the file of this patent

UNITED STATES PATENTS

| | | |
|---|---|---|
| 2,297,365 | Ostline | Sept. 29, 1942 |
| 2,352,492 | Ostline | June 27, 1944 |
| 2,411,526 | Deakin et al. | Nov. 26, 1946 |
| 2,445,829 | Henrikson et al. | July 27, 1948 |
| 2,697,748 | Gooderham | Dec. 21, 1954 |
| 2,782,257 | Blashfield et al. | Feb. 19, 1957 |